(12) United States Patent
Kim et al.

(10) Patent No.: US 11,013,656 B2
(45) Date of Patent: May 25, 2021

(54) MOTION ASSISTANCE APPARATUS

(71) Applicant: Samsung Electronics Co., Ltd., Suwon-si (KR)

(72) Inventors: Jeonghun Kim, Suwon-si (KR); Hyun Do Choi, Yongin-si (KR); Se-Gon Roh, Suwon-si (KR); Youngbo Shim, Seoul (KR); Minhyung Lee, Seoul (KR); Youn Baek Lee, Yongin-si (KR); Jongwon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 337 days.

(21) Appl. No.: 15/934,203

(22) Filed: Mar. 23, 2018

(65) Prior Publication Data

US 2019/0151182 A1 May 23, 2019

(30) Foreign Application Priority Data

Nov. 21, 2017 (KR) .......... 10-2017-0155862

(51) Int. Cl.
*A61H 3/00* (2006.01)
*B25J 9/00* (2006.01)
*A61H 1/02* (2006.01)

(52) U.S. Cl.
CPC ............. *A61H 3/00* (2013.01); *A61H 1/0262* (2013.01); *A61H 1/0266* (2013.01);
(Continued)

(58) Field of Classification Search
CPC .... A61H 1/024; A61H 1/0262; A61H 1/0266; A61H 1/0237; A61H 3/00;
(Continued)

(56) References Cited

U.S. PATENT DOCUMENTS 4,102,337 A * 7/1978 Golia ................ A61F 5/0127
602/16
5,215,508 A 6/1993 Bastow
(Continued)

FOREIGN PATENT DOCUMENTS

CN 102397118 A 4/2012
JP 57-25553 B2 5/2015
(Continued)

OTHER PUBLICATIONS

"Reducing the energy cost of human walking using an unpowered exoskeleton," Nature, 2015.
"Autonomous exoskeleton reduces metabolic cost of human walking during load carriage," Mooney et al. Journal of NeuroEngineering and Rehabilitation, 2014.
"A Simple Exoskeleton That Assists Plantarflexion Can Reduce the Metabolic Cost of Human Walking," PLOS ONE, Feb. 2013.
(Continued)

*Primary Examiner* — Valerie L Woodward
*Assistant Examiner* — Paige Kathleen Bugg
(74) *Attorney, Agent, or Firm* — Harness, Dickey & Pierce, P.L.C.

(57) ABSTRACT

A motion assistance apparatus including a proximal support configured to support a proximal part of a user, a first drive link and a second drive link configured to perform translational motions with respect to the proximal support at different velocities, a support link with both ends rotatably connected to the first drive link and the second drive link, respectively, the support link having a variable length, and a distal support connected to the support link, the distal support configured to support a distal part of the user is provided.

19 Claims, 26 Drawing Sheets

(52) U.S. Cl.
CPC ....... *B25J 9/0006* (2013.01); *A61H 2001/027* (2013.01); *A61H 2003/007* (2013.01); *A61H 2201/0192* (2013.01); *A61H 2201/0196* (2013.01); *A61H 2201/1215* (2013.01); *A61H 2201/1246* (2013.01); *A61H 2201/149* (2013.01); *A61H 2201/164* (2013.01); *A61H 2201/165* (2013.01); *A61H 2201/1642* (2013.01); *A61H 2201/1671* (2013.01); *A61H 2201/1673* (2013.01); *A61H 2201/5005* (2013.01); *A61H 2201/5007* (2013.01); *A61H 2201/5064* (2013.01); *A61H 2201/5069* (2013.01); *A61H 2203/0406* (2013.01); *A61H 2205/10* (2013.01)

(58) Field of Classification Search
CPC ...... A61H 2001/027; A61H 2001/0203; A61H 2003/007; A61H 2003/043; A61H 2201/0192; A61H 2201/0196; A61H 2201/1215; A61H 2201/1246; A61H 2201/149; A61H 2201/164; A61H 2201/1642; A61H 2201/165; A61H 2201/1671; A61H 2201/1673; A61H 2201/5005; A61H 2201/5007; A61H 2201/5064; A61H 2201/5069; A61H 2203/0406; A61H 2205/10; A61H 2205/12; A61H 2205/106; B25J 9/0006; A61F 5/0111; A61F 2/66
USPC .......................................................... 601/33
See application file for complete search history.

(56) References Cited

U.S. PATENT DOCUMENTS

| | | | |
|---|---|---|---|
| 9,480,618 | B2 | 11/2016 | Hsiao-Wecksler et al. |
| 2006/0069336 | A1* | 3/2006 | Krebs ................ A61H 3/00 602/28 |
| 2013/0046218 | A1 | 2/2013 | Wiggin et al. |
| 2015/0209214 | A1 | 7/2015 | Herr et al. |
| 2015/0321340 | A1* | 11/2015 | Smith ............. B25J 9/0006 74/490.01 |
| 2016/0175180 | A1* | 6/2016 | Bond ............... A61F 5/0102 602/23 |
| 2018/0055711 | A1* | 3/2018 | Choi ................ A61H 3/06 |
| 2018/0055712 | A1* | 3/2018 | Gayral ............ A61H 1/0266 |

FOREIGN PATENT DOCUMENTS

| | | | | |
|---|---|---|---|---|
| JP | 59-37935 | B2 | 6/2016 | |
| KR | 2015-0085608 | A | 7/2015 | |
| KR | 10-1703634 | B1 | 2/2017 | |
| KR | 10-1716761 | B1 | 3/2017 | |
| KR | 10-2018-0023708 | A | 3/2018 | |
| WO | WO-2016/067229 | A1 | 5/2016 | |
| WO | WO-2016067229 | A1 * | 5/2016 | ........ A61F 5/0127 |
| WO | WO-2016/162425 | A1 | 10/2016 | |

OTHER PUBLICATIONS

"Mechanics and energetics of level walking with powered ankle exoskeletons," The Journal of Experimental Biology, 2008.
Extended European Search Report dated Dec. 14, 2018 for corresponding EP Application No. 18199055.7.

* cited by examiner

US 11,013,656 B2

MOTION ASSISTANCE APPARATUS

CROSS-REFERENCE TO RELATED APPLICATION

This application claims under 35 U.S.C. § 119 to Korean Patent Application No. 10-2017-0155862, filed on Nov. 21, 2017, in the Korean Intellectual Property Office, the entire contents of which are incorporated herein by reference in their entirety.

BACKGROUND

1. Field

At least one example embodiment relates to a motion assistance apparatus.

2. Description of the Related Art

With the onset of rapidly aging societies, an increasing number of people may experience inconvenience and/or pain from joint problems. Thus, there may be a growing interest in walking assistance apparatuses enabling the elderly and/or patients having joint problems to walk with less effort.

SUMMARY

Some example embodiments relate to a motion assistance apparatus.

In some example embodiment, the motion assistance apparatus may include a proximal support configured to support a proximal part of a user; a first drive link and a second drive link, the first drive link and the second drive link each configured to perform translational motions with respect to the proximal support such that the first drive link and the second drive link perform the translational motions at different velocities; a support link having a first end and a second end, the first end rotatably connected to the first drive link and the second end rotatably connected to the second drive link, the support link configured to vary a length thereof; and a distal support connected to the support link, the distal support configured to support a distal part of the user.

In some example embodiment, the support link is configured to simultaneously perform a translational motion and a rotational motion with respect to the proximal support.

In some example embodiment, the support link is configured to rotate about a remote center of motion (RCM) in a joint of the user connecting the distal part and the proximal part of the user, or in a vicinity of the joint.

In some example embodiment, the support link is configured to increase a distance from the support link to the RCM, in response to an increase in the length of the support link, and the support link is configured to decrease the distance from the support link to the RCM in response to a decrease in the length of the support link.

In some example embodiment, the support link includes a first sub-support link rotatably connected to the first drive link; and a second sub-support link rotatably connected to the second drive link, wherein the support link is configured to adjust a set distance between the first sub-support link and the second sub-support link.

In some example embodiment, the first sub-support link is configured to slide along the second sub-support link to adjust the set distance, and the support link further includes a support link fixture configured to fix the first sub-support link and the second sub-support link at the set distance.

In some example embodiment, the support link further includes a turnbuckle configured to screw to the first sub-support link and the second sub-support link to fix the first sub-support link and the second sub-support link at the set distance.

In some example embodiment, the motion assistance apparatus further includes a coupling link configured to rotate about a first rotation axis on the proximal support, the coupling link rotatably connected to the first drive link and the second drive link; and a connecting link configured to rotate about a second rotation axis on the proximal support, the connecting link rotatably connected to the second drive link, the first rotation axis being a different rotational axis from the second rotation axis.

In some example embodiment, the coupling link and the connecting link are both connected to the second drive link such that the coupling link and the connecting link are in parallel.

In some example embodiment, the proximal support is configured to support a shank of the user, the distal support is configured to support a foot of the user, and the distal support rotatably connected to the support link, and the support link is on a front side of the user when the user wears the motion assistance apparatus.

Other example embodiments relate to a motion assistance apparatus.

In some example embodiments, the motion assistance apparatus may include a proximal support configured to support a proximal part of a user; a first drive link and a second drive link, the first drive link and the second drive link each configured to perform translational motions with respect to the proximal support such that the first drive link and the second drive link perform the translational motions at different velocities; a support link rotatably connected to the first drive link and the second drive link; a distal support connected to the support link, the distal support configured to support a distal part of the user; and a coupling link configured to rotate about a first rotation axis on the proximal support, the coupling link rotatably connected to the first drive link and the second drive link, the coupling link configured to vary a length thereof.

In some example embodiments, the first drive link is connected to a first portion of the coupling link, the second drive link is connected to a second portion of the coupling link, and the coupling link is configured to adjust a distance between the first portion and the second portion by varying the length of the coupling link.

In some example embodiments, the support link is configured to simultaneously perform a translational motion and a rotational motion with respect to the proximal support.

In some example embodiments, the support link is configured to rotate about a remote center of motion (RCM) in a joint of the user connecting the distal part and the proximal part of the user, or in a vicinity of the joint.

In some example embodiments, the coupling link is configured to increase a distance from the support link to the RCM in response to an increase in the length of the coupling link, and the coupling link is configured to decrease the distance from the support link to the RCM in response to a decrease in the length of the coupling link.

In some example embodiments, the coupling link includes a first sub-coupling link rotatably connected to the first rotation axis; and a second sub-coupling link rotatably connected to the first drive link, the second sub-coupling link configured to move relative to the first sub-coupling link.

In some example embodiments, the motion assistance apparatus further includes a connecting link configured to rotate about a second rotation axis on the proximal support, the second rotation axis being a different axis from the first rotation axis, the connecting link rotatably connected to the second drive link such that the connecting link and the coupling link are in parallel.

Other example embodiments relate to a motion assistance apparatus.

In some example embodiments, the motion assistance apparatus may include a proximal support configured to support a proximal part of a user; a distal support configured to support a distal part of the user; a support link connected to the distal support; a first drive link rotatably connected to a first end of the support link, the first drive link configured to perform a translational motion with respect to the proximal support; and a second drive link rotatably connected to a second end of the support link, the second drive link configured to perform a translational motion with respect to the proximal support such that the second drive links performs the translational motion with respect to the proximal support at a slower velocity than the first drive link performs the translational motion with respect to the proximal support, wherein at least one of the first drive link and the second drive link is configured to vary a length thereof.

In some example embodiments, the support link is configured to simultaneously perform a translational motion and a rotational motion with respect to the proximal support.

In some example embodiments, a minimum angle between the distal support and the proximal support decreases in response to a decrease in the length of the first drive link or an increase in the length of the second drive link, and the minimum angle between the distal support and the proximal support increases in response to an increase in the length of the first drive link or a decrease in the length of the second drive link.

In some example embodiments, the at least one of the first drive link and the second drive link each include a first sub-drive link rotatably connected to the first end of the support link; a second sub-drive link configured to slide along the first sub-drive link to vary the length of a respective one of the at least one of the first drive link and the second drive link; and a drive link fixture configured to fix the first sub-drive link and the second sub-drive link to set the length of the respective one of the at least one of the first drive link and the second drive link.

In some example embodiments, the at least one of the first drive link and the second drive link each includes a first sub-drive link rotatably connected to the first end of the support link; a second sub-drive link configured to move relative to the first sub-drive link to vary the length of a respective one of the at least one of the first drive link and the second drive link; and a turnbuckle screwed to the first sub-drive link and the second sub-drive link to set the length of the respective one of the at least one of the first drive link and the second drive link.

In some example embodiments, the motion assistance apparatus further includes a coupling link configured to rotate about a first rotation axis on the proximal support, the coupling link rotatably connected to the first drive link and the second drive link; and a connecting link configured to rotate about a second rotation axis on the proximal support, the connecting link rotatably connected to the second drive link, the second rotation axis being a different axis from the first rotation axis.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
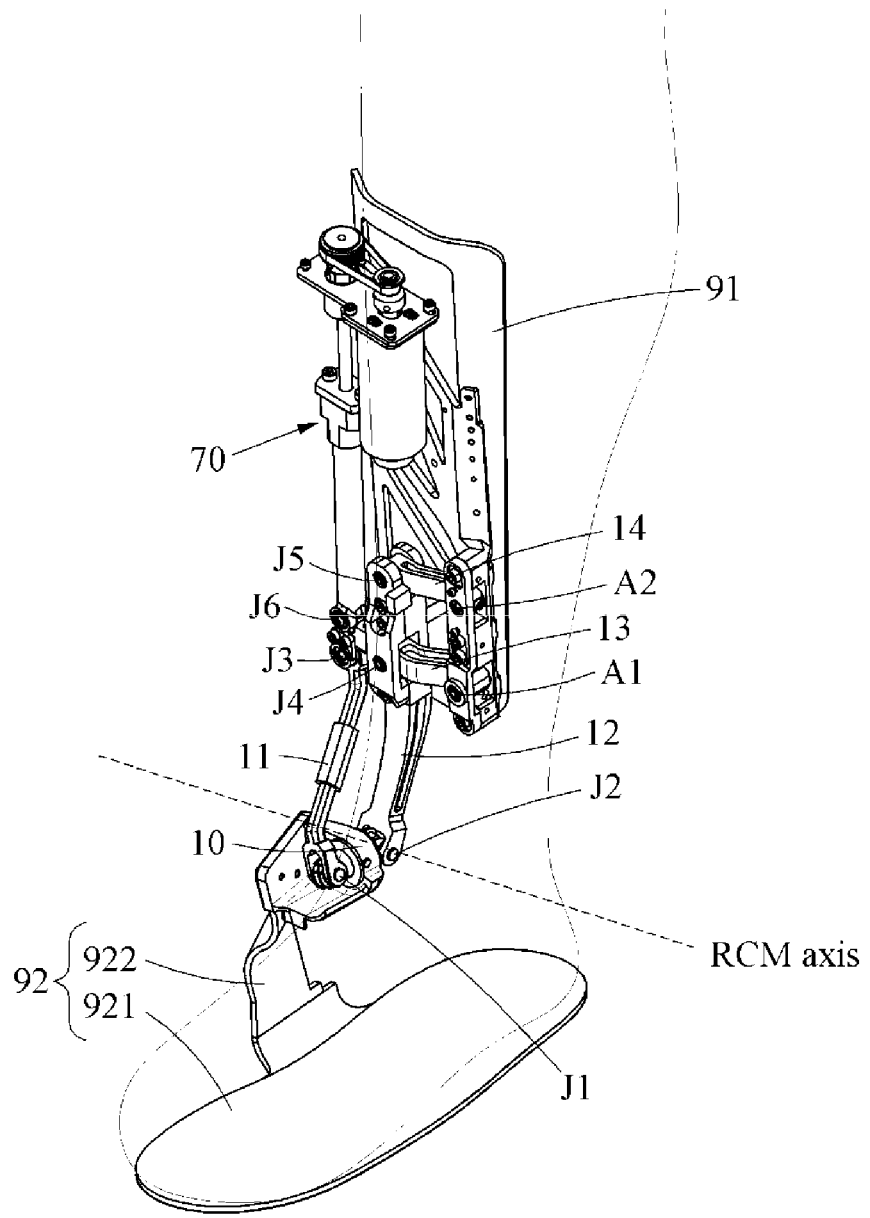
FIG. 1 is a perspective view illustrating a motion assistance apparatus according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 2:
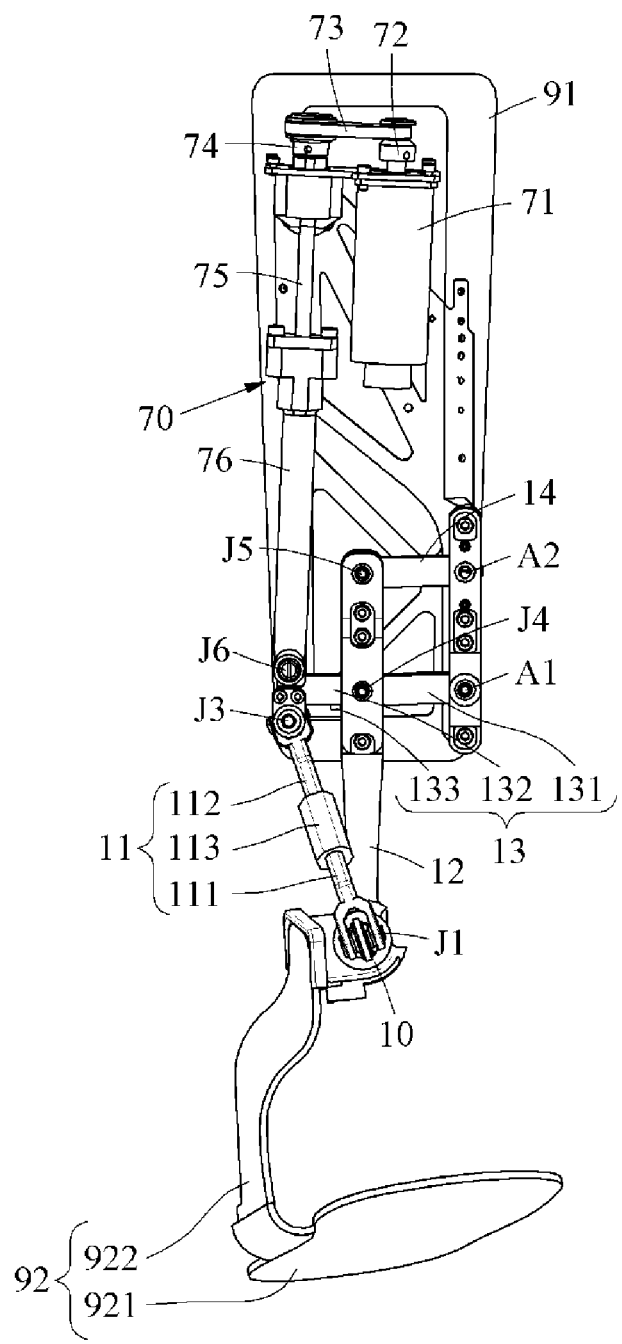
FIG. 2 is a front view illustrating a motion assistance apparatus according to at least one example embodiment.
Figure 3:
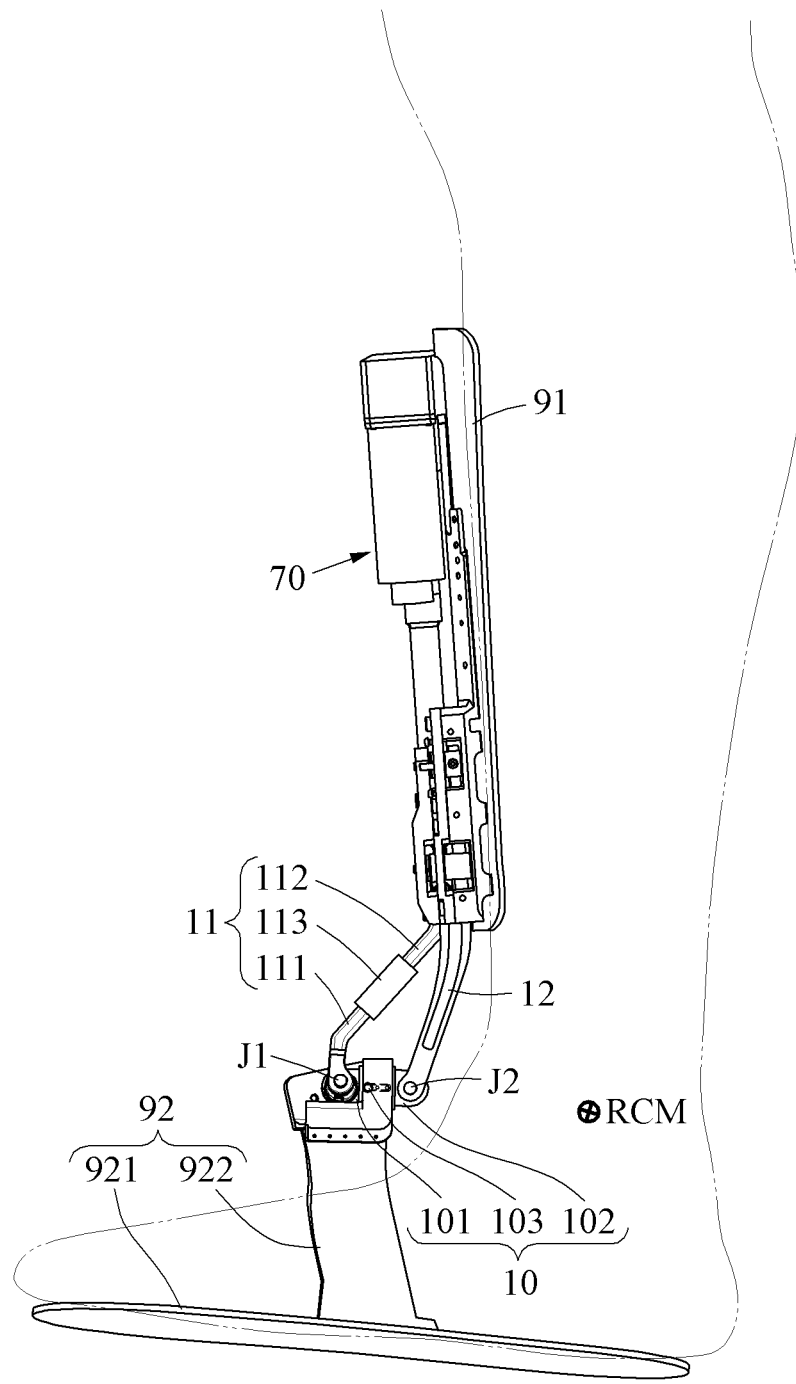
FIG. 3 is a side view illustrating a user wearing a motion assistance apparatus according to at least one example embodiment.

FIG. 1 is a perspective view illustrating a motion assistance apparatus according to at least one example embodiment, FIG. 2 is a front view illustrating the motion assistance apparatus according to at least one example embodiment, and FIG. 3 is a side view illustrating a user wearing the motion assistance apparatus according to at least one example embodiment.

Figure 4:
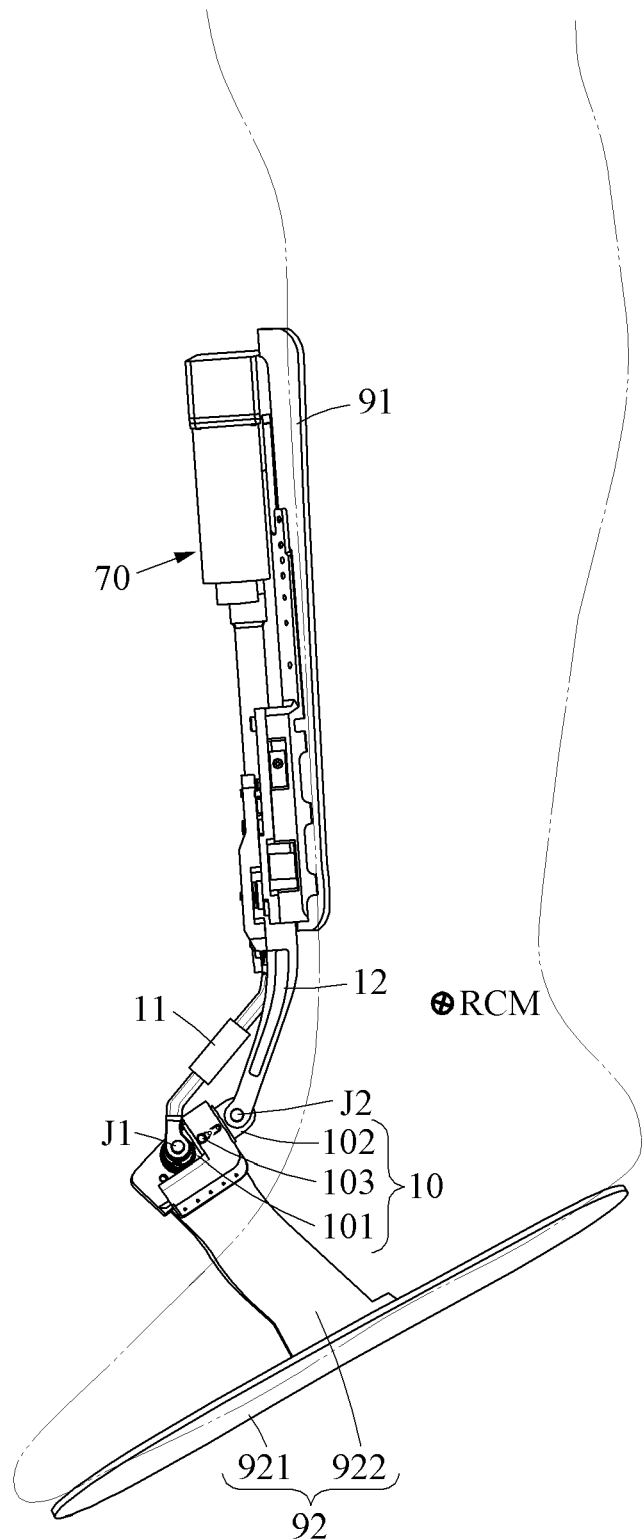
FIG. 4 is a side view illustrating a plantar flexion motion of a user wearing a motion assistance apparatus according to at least one example embodiment.
Figure 5:
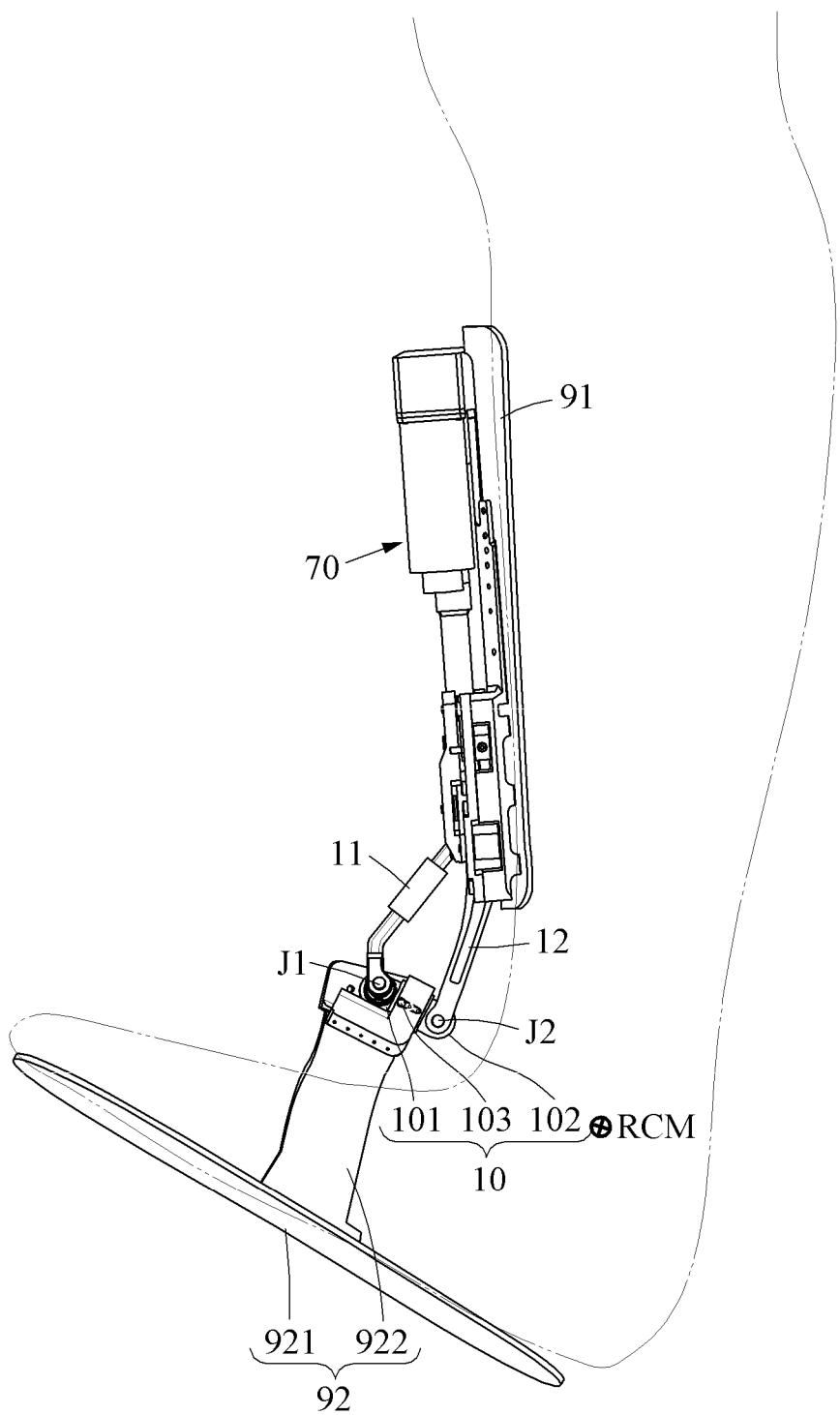
FIG. 5 is a side view illustrating a dorsi flexion motion of a user wearing a motion assistance apparatus according to at least one example embodiment.

FIG. 4 is a side view illustrating a plantar flexion motion of the user wearing the motion assistance apparatus according to at least one example embodiment, and FIG. 5 is a side view illustrating a dorsi flexion motion of the user wearing the motion assistance apparatus according to at least one example embodiment.

Referring to FIGS. 1 through 5, a motion assistance apparatus may be worn by a user to assist a motion of the user. The user may correspond to a human, an animal, or a robot. However, the user is not limited thereto. The motion assistance apparatus may include a proximal support 91, a distal support 92, a support link 10, a first drive link 11, a second drive link 12, a coupling link 13, a connecting link 14, and an actuator 70.

The proximal support 91 may support a proximal part of the user, and the distal support 92 may support a distal part of the user. The motion assistance apparatus may assist a joint motion of the user by adjusting an angle between the proximal support 91 and the distal support 92. For example, the proximal support 91 may support a shank of the user, the distal support 92 may support a foot of the user, and the motion assistance apparatus may assist a plantar flexion motion and/or a dorsi flexion motion of a talocrural joint (or, alternatively, an ankle joint) of the user. However, the joint assisted by the motion assistance apparatus is not limited to the talocrural joint. For example, the proximal support 91 may support a forearm of the user, the distal support 92 may assist a metacarpal of the user, and the motion assistance apparatus may assist a flexion motion and/or an extension motion of an articulatio radiocarpalis (or alternatively, a wrist joint) of the user. Hereinafter, a case in which the motion assistance apparatus assists a motion of the talocrural joint will be described.

The proximal support 91 may be attached to the shank of the user. For example, the proximal support 91 may include a calf attachable part (not shown) configured to enclose a calf of the user. A circumference of the calf attachable part may be adjusted based on a size of the calf of the user. The calf attachable part may be an elastic band. The proximal support 91 may be attached to a front side of the shank of the user. The proximal support 91 may have a shape to be stably supported by the shank of the user. For example, the proximal support 91 may be a plate with both sides bent toward the shank of the user.

The distal support 92 may be attached to the foot of the user. When the support link 10 rotates clockwise or counterclockwise in the example of FIG. 3, the distal support 92 may rotate clockwise or counterclockwise, similar to the support link 10, thereby assisting a motion of the foot of the user. For example, the distal support 92 may include an insole part 921 configured to support a sole of the foot of the user, and a connecting part 922 configured to cover a side of the foot of the user and connected to the support link 10. The motion assistance apparatus may be easily inserted into a shoe that the user wears.

For example, the connecting part 922 may be rotatably connected to the support link 10 along a circumference of the support link 10. In this example, the user may perform an inversion motion and/or an eversion motion of a talocalcaneal joint while wearing the motion assistance apparatus. Meanwhile, unlike the drawing, the connecting part 922 may be fixed to the support link 10.

The support link 10 may simultaneously perform a translational motion and a rotational motion with respect to the proximal support 91. The support link 10 may rotate about a remote center of motion (RCM). In the structure as shown in FIG. 1 and the like, the RCM may be formed in the vicinity of the talocrural joint of the user. The RCM may be determined based on lengths of the plurality of links 10, 11, 12, 13 and 14 constituting the motion assistance apparatus. The support link 10 may be connected to the distal support 92 and transmit power thereto. When the support link 10 rotates about the RCM, the distal support 92 connected to the support link 10 may also rotate about the RCM.

Both ends of the support link 10 may be rotatably connected to the first drive link 11 and the second drive link 12, respectively. In detail, a first end of the support link 10 may be connected to the first drive link 11 by a first joint J1, and a second end of the support link 10 may be connected to the second drive link 12 by a second joint J2. Any one or any combination of the first joint J1 and the second joint J2 may be a joint that implements a 2-degree of freedom (DOF) rotational motion. For example, as shown in FIG. 1, the first joint J1 may be a universal joint or a ball joint that enables the support link 10 and the first drive link 11 to rotate with 2-DOF. The second joint J2 may be a joint that enables the support link 10 and the second drive link 12 to rotate with 1-DOF, for example, a hinge. By the above connection relationship, an angle between the first drive link 11 and the second drive link 12 projected respectively in a frontal plane (see FIG. 2) and a sagittal plane (see FIG. 3) may change simultaneously based on driving of the actuator 70.

The support link 10 may have a variable length. By adjusting the length of the support link 10, a position of the RCM may change as described below. For example, as shown in FIGS. 3 through 7, the support link 10 may include a first sub-support link 101, a second sub-support link 102, and a support link fixture 103. The first sub-support link 101 may be rotatably connected to the first joint J1. The second sub-support link 102 may be rotatably connected to the second joint J2. The support link fixture 103 may fix the first sub-support link 101 and the second sub-support link 102. When the first sub-support link 101 and the second sub-support link 102 move relatively, the length of the support link 10 may change. An example of a mechanism in which the first sub-support link 101 and the second sub-support link 102 move relatively will be described further with reference to FIGS. 6 and 7.

The first drive link 11 may connect the support link 10 and the coupling link 13. The first drive link 11 may be rotatably connected to the support link 10 by the first joint J1, and rotatably connected to the coupling link 13 by a third joint J3. The third joint J3 may be a joint that implements a 2-DOF rotational motion. For example, the third joint J3 may be a universal joint or a ball joint.

The second drive link 12 may connect the support link 10, the coupling link 13, and the connecting link 14. The second drive link 12 may be rotatably connected to the support link 10 by the second joint J2, rotatably connected to the coupling link 13 by a fourth joint J4, and rotatably connected to the connecting link 15 by a fifth joint J5.

One of the first drive link 11 and the second drive link 12 may have a variable length. For example, one of the first drive link 11 and the second drive link 12 may include a first sub-drive link 111, a second sub-drive link 112, and a driving link fixture 113. Although FIGS. 1 and 2 illustrate the first drive link 11 including the first sub-drive link 111, the second sub-drive link 112, and the driving link fixture 113, examples are not limited thereto. The first sub-drive link 111 may be rotatably connected to the first joint J1. The second sub-drive link 112 may be rotatably connected to the third joint J3. The driving link fixture 113 may fix the first sub-drive link 111 and the second sub-drive link 112. When the first sub-drive link 111 and the second sub-drive link 112 move relatively, the length of the first drive link 11 may change. An example of a mechanism in which the first sub-drive link 111 and the second sub-drive link 112 move relatively will be described further with reference to FIGS. 10 and 11.

The coupling link 13 may couple the first drive link 11 and the second drive link 12. The coupling link 13 may rotate about a first rotation axis A1 on the proximal support 91. The coupling link 13 may be rotatably connected to the first drive link 11 by the third joint J3, and rotatably connected to the second drive link 12 by the fourth joint J4. When the coupling link 13 rotates, each of the first drive link 11 and the second drive link 12 may perform a translational motion with respect to the proximal support 91. A distance between the third joint J3 and the first rotation axis A1 may be greater than a distance between the fourth joint J4 and the first rotation axis A1. That is, a radius of gyration of the third joint J3 may be greater than a radius of gyration of the fourth joint J4. When the coupling link 13 rotates, the first drive link 11 may perform the translational motion at a faster velocity than the second drive link 12. Meanwhile, the first drive link 11 may simultaneously perform the translational motion and a rotational motion with respect to the proximal support 91.

For example, the coupling link 13 may be installed to perform a rotational motion on a plane parallel to the frontal plane of the user when the user wears the motion assistance apparatus. By the above structure, a protruding height of the entire motion assistance apparatus from the shank of the user may be reduced.

Meanwhile, unlike the above, the coupling link 13 may be installed to perform a rotational motion on a plane parallel to the sagittal plane of the user, as shown in FIGS. 16 through 24. In this example, any one or any combination of the first joint J1 and the third joint J3 may be configured as a joint having a 1-DOF of rotation, for example, a hinge.

The coupling link 13 may have a variable length. By adjusting the length of the coupling link 13, a distance between a portion connected to the first drive link 11 and a portion connected to the second drive link 12 on the coupling link 13, for example, a distance between the third joint J3 and the fourth joint J4, may be adjusted. For example, the coupling link 13 may include a first sub-coupling link 131, a second sub-coupling link 132, and a coupling link fixture 133. The first sub-coupling link 131 may be rotatably connected to the first rotation axis A1. The second sub-coupling link 132 may be rotatably connected to the third joint J3. The coupling link fixture 133 may fix the first sub-coupling link 131 and the second sub-coupling link 132. When the first sub-coupling link 131 and the second sub-coupling link 132 move relatively, the length of the coupling link 13 may change. An example of a mechanism in which the first sub-coupling link 131 and the second sub-coupling link 132 move relatively will be described further with reference to FIGS. 8 and 9.

The connecting link 14 may rotate about a second rotation axis A2 on the proximal support 91. The connecting link 14 may be rotatably connected to the second drive link 12 by the fifth joint J5. For example, the connecting link 14 may be in parallel to the coupling link 13, and a distance from the first rotation axis A1 to the fourth joint J4 may be equal to a distance from the second rotation axis A2 to the fifth joint J5. In this example, the second drive link 12 may move while being in parallel to a virtual line connecting the first rotation axis A1 and the second rotation axis A2.

For example, the connecting link 14 may be installed to perform a rotational motion on the plane parallel to the frontal plane of the user when the user wears the motion assistance apparatus. By the above structure, the protruding height of the entire motion assistance apparatus from the shank of the user may be reduced.

Meanwhile, unlike the above, the connecting link 14 may be installed to perform a rotational motion on the plane parallel to the sagittal plane of the user, as shown in FIGS. 16 through 24.

The first joint J1 may be in front of the second drive link 12. For example, when viewing the motion assistance apparatus from a side as in FIG. 3, the first drive link 11 may be in front of the second drive link 12. By the above structure, although the coupling link 13 and the connecting link 14 perform the rotational motions on the plane parallel to the frontal plane of the user, the support link 10 may rotate about the RCM in rear of the second drive link 12.

The support link 10, the first drive link 11, the second drive link 12, the coupling link 13, and the connecting link 14 may move with 1-DOF. That is, by driving one of the support link 10, the first drive link 11, the second drive link 12, the coupling link 13 and the connecting link 14, the distal support 92 may be driven.

The actuator 70 may move one of the support link 10, the first drive link 11, the second drive link 12, the coupling link 13, and the connecting link 14. For example, the actuator 70 may pull the first drive link 11 toward the actuator 70, or push the first drive link 11 away from the actuator 70. When the actuator 70 pulls the first drive link 11 toward the actuator 70, the second drive link 12 may be pulled toward the actuator 70 at a slower velocity than the first drive link 11. For example, a direction toward the actuator 70 may be an upward direction as shown in FIGS. 3 and 4. When the actuator 70 pulls the first drive link 11 toward the actuator 70, the second drive link 12 may perform a translational motion in the upward direction at a slower velocity than the first drive link 11. In this example, the support link 10 may move such that an angle between the support link 10 and the second drive link 12 may decrease, thereby assisting a dorsi flexion motion of the foot of the user.

Meanwhile, when the actuator 70 pushes the first drive link 11 away from the actuator 70, the second drive link 12 may be pushed away from the actuator 70 at a slower velocity than the first drive link 11. For example, a direction away from the actuator 70 may be a downward direction as shown in FIGS. 3 and 4. When the actuator 70 pushes the first drive link 11 away from the actuator 70, the second drive link 12 may perform a translational motion in the downward direction at a slower velocity than the first drive link 11. In this example, the support link 10 may move such that the angle between the support link 10 and the second drive link 12 may increase, thereby assisting a plantar flexion motion of the foot of the user.

When the actuator 70 moves an upper end of the first drive link 11 downward in the example of FIG. 2, the coupling link 13 may rotate counterclockwise. For example, the actuator 70 may be rotatably installed on the proximal support 91. As illustrated in FIG. 2, the actuator 70 may include a drive source 71, a drive shaft 72, a power transmitting member 73, a power receiver 74, a drive shaft 75, and a slider 76.

The drive source 71 may generate power to drive the first drive link 11. For example, the drive source 71 may be a motor. According to other example embodiments, the driving source 12 may include at least one piston or cylinder device that is operated by the electric energy or by fluidic pressure such as, for example, hydraulic pressure or pneumatic pressure. The drive source 71 may be on the proximal support 91. Meanwhile, unlike the above, the drive source 71 may be on a portion spaced apart from the proximal support 91, and transmit the power to the first drive link 11 through another power transmitting device such as a cable, a belt, or a gear train.

The drive shaft 72 may rotate using the power received from the drive source 71. The power transmitting member 73 may connect the rotary drive shaft 72 to another rotary body. For example, the power transmitting member 73 may be a belt wound over the drive shaft 72 and the power receiver 74. The drive shaft 75 and the power receiver 74 may be formed as an integral body. The drive shaft 75 may include threads on an outer surface. The slider 76 may slide along the drive shaft 75. The slider 76 may include threads on an inner surface, the threads configured to engage with the threads of the drive shaft 75. A first end of the slider 76 may be rotatably connected to the coupling link 13. For example, the slider 76 may be rotatably connected to the coupling link 13 by a sixth joint J6.

The actuator 70 may be connected to a controller (not shown), and the controller may be connected to one or more sensors (not shown) configured to sense various environmental factors such as pressure.

The controller may include a processor and a memory. The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The processor may processor may be an arithmetic logic unit, a digital signal processor, a microcomputer, a field programmable array, a programmable logic unit, a microprocessor or any other device capable of responding to and executing instructions in a defined manner. The memory may contain computer readable code that, when executed by the processor, configures the processor as a special purpose computer.

For example, the memory may contain computer readable code that, when executed by the processor, configures the processor as a special purpose computer to determine a gait state based on a pressure measured by the pressure sensor, and instruct the actuator 70 to generate power to perform dorsi-flexion motion or plantar-flexion motion based on the pressure measured by the pressure sensor.

Figure 6:
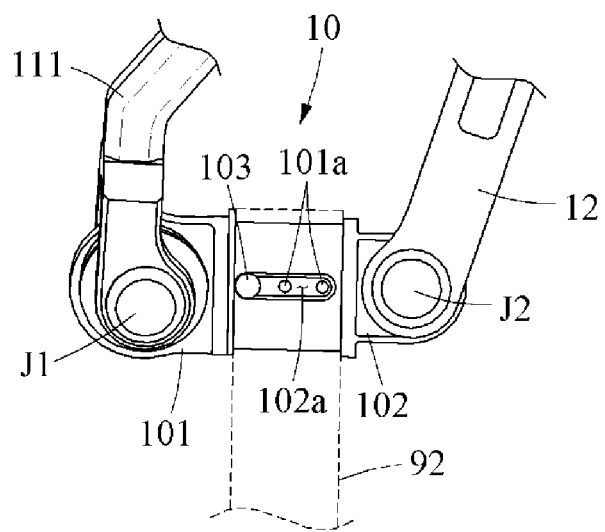
FIG. 6 is a side view illustrating a support link according to at least one example embodiment.
Figure 7:
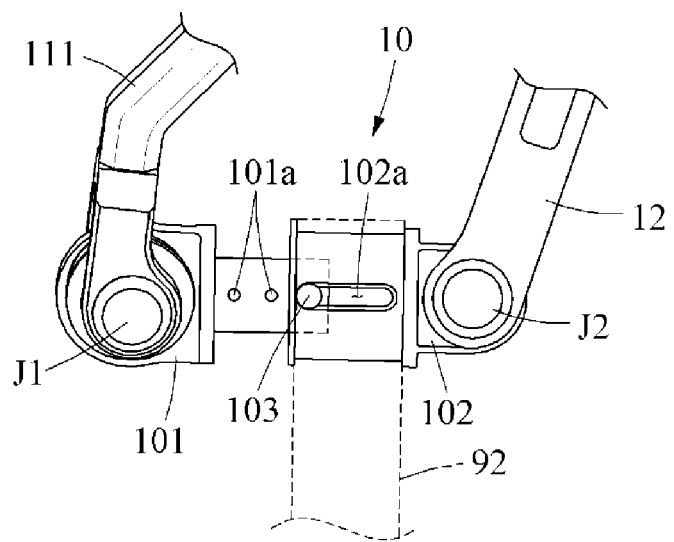
FIG. 7 is a side view illustrating a support link with an increased length according to at least one example embodiment.

FIG. 6 is a side view illustrating a support link according to at least one example embodiment, and FIG. 7 is a side view illustrating the support link with an increased length according to at least one example embodiment.

Referring to FIGS. 6 and 7, the support link 10 may have a variable length. For example, the support link 10 may include the first sub-support link 101, the second sub-support link 102, and the support link fixture 103.

The first sub-support link 101 may be rotatably connected to the first sub-drive link 111 of the drive link 11 by the first joint J1 with 2-DOF. The second sub-support link 102 may be rotatably connected to the second drive link 12 by the second joint J2. The first sub-support link 101 and the second sub-support link 102 may move relative to each other.

The first sub-support link 101 may slide along the second sub-support link 102. One of the first sub-support link 101 and the second sub-support link 102 may have a hollow, and at least a portion of the other one of the first sub-support link 101 and the second sub-support link 102 may be inserted into the hollow. For example, at least a portion of the first sub-support link 101 may be inserted into a hollow of the second sub-support link 102. As an inserting length of the first sub-support link 101 into the second sub-support link 102 increases, a distance between the first joint J1 and the second joint J2 may decrease. That is, the length of the support link 10 may decrease.

For example, the first sub-support link 101 may include a plurality of insertion recesses 101a a desired (or, alternatively, a predetermined) distance spaced apart from each other in a longitudinal direction of the first sub-support link 101, and the second sub-support link 102 may include a longitudinal slot 102a communicating with the plurality of insertion recesses 101a. The support link 10 may include the support link fixture 103 configured to fix the first sub-support link 101 and the second sub-support link 102. For example, the support link fixture 103 may be a bolt.

The support link fixture 103 may be inserted simultaneously into one of the plurality of insertion recesses 101a, and the longitudinal slot 102a. The support link fixture 103 may restrict a relative movement of the first sub-support link 101 and the second sub-support link 102. For example, the support link fixture 103 may pass through the longitudinal slot 102a and be screwed into one of the plurality of insertion recesses 101a. Based on a position of the insertion recess 101a into which the support link fixture 103 is inserted and a position of the support link fixture 103 on the longitudinal slot 102a, the length of the support link 10 may be determined. For example, FIG. 6 illustrates the support link 10 with a minimized length, and FIG. 7 illustrates the support link 10 with a maximized length. The support link fixture 103 may be fixed at a desired (or, alternatively, a predetermined) position on the longitudinal slot 102a, and thus the user may linearly adjust the length of the support link 10.

When the length of the support link 10 is adjusted, the position of the RCM of the motion assistance apparatus may change. When the length of the support link 10 increases, a distance from the support link 10 to the RCM may increase. When the length of the support link 10 decreases, the distance from the support link 10 to the RCM may decrease. A mechanism in which the position of the RCM of the motion assistance apparatus changes when the length of the support link 10 is adjusted will be described further with reference to FIGS. 16 through 18.

Meanwhile, the distal support 92 may be rotatably installed on the first sub-support link 101. For example, the first sub-support link 101 may include a pair of flanges configured to prevent a separation of the distal support 92. By the above structure, the motion assistance apparatus may allow an inversion motion and/or an eversion motion of the talocalcaneal joint of the user. Thus, the user may comfortably perform the eversion or inversion motion without receiving external force generated by the drive link 11.

While not illustrated, in some other example embodiments, the support link 10 may include a holding device, such as an electromagnet, and the controller (not shown) may be configured to activate the holding device while providing the assistance force to perform the dorsi-flexion motion and/or the plantar-flexion motion such that the user is restricted from performing one or more of eversion and inversion motion. Therefore, the motion assistance apparatus may allow the user to perform translational motion and rotational motion while securing the user's ankle from injury while assisting the user.

Figure 8:
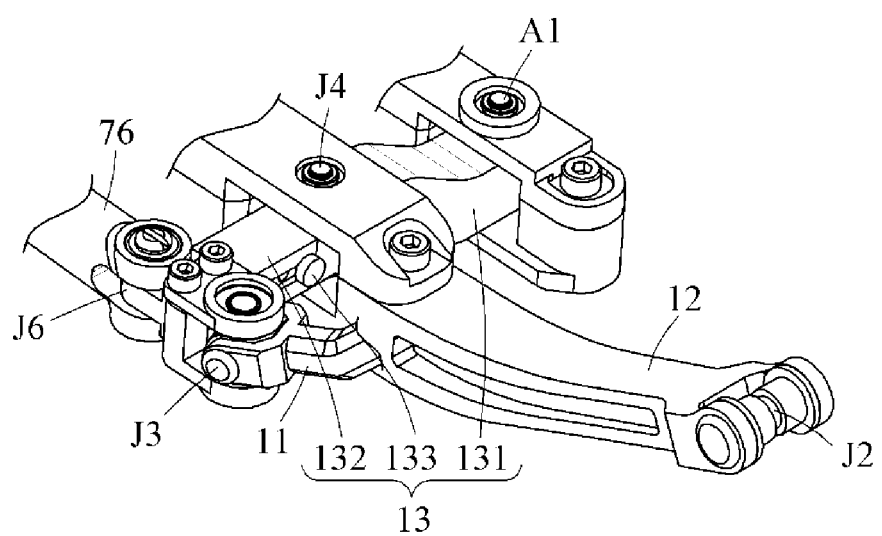
FIG. 8 is a perspective view illustrating a coupling link according to at least one example embodiment.
Figure 9:
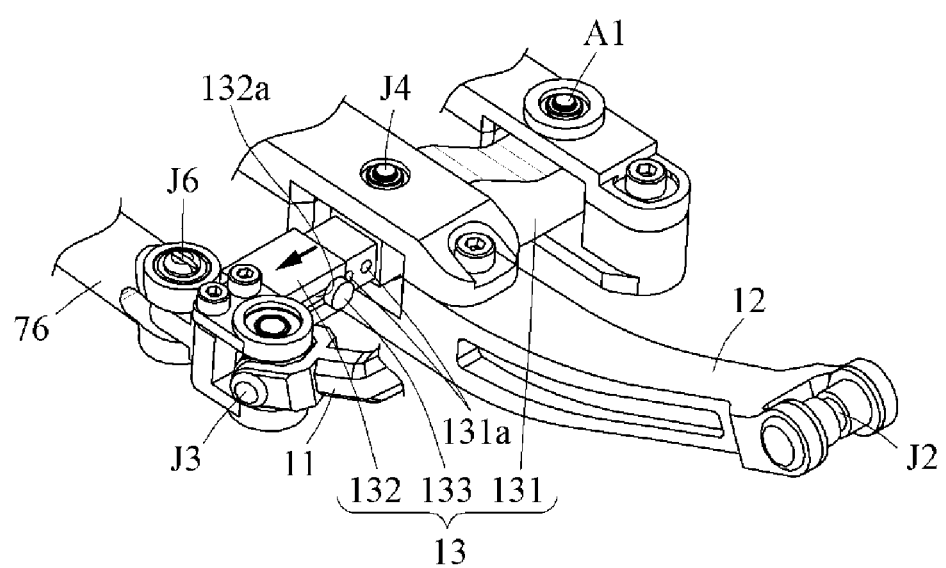
FIG. 9 is a perspective view illustrating a coupling link with an increased length according to at least one example embodiment.

FIG. 8 is a perspective view illustrating a coupling link according to at least one example embodiment, and FIG. 9 is a perspective view illustrating the coupling link with an increased length according to at least one example embodiment.

Referring to FIGS. 8 and 9, the coupling link 13 may have a variable length. For example, the coupling link 13 may include the first sub-coupling link 131, the second sub-coupling link 132, and the coupling link fixture 133.

The second sub-coupling link 132 may be rotatably connected to the first drive link 11 by the third joint J3 with 2-DOF. The first sub-coupling link 131 may be rotatably connected to the proximal support 91 of FIG. 1 by the first rotation axis A1, and rotatably connected to the second drive link 12 by the fourth joint J4. The first sub-coupling link 131 and the second sub-coupling link 132 may move relative to each other.

The second sub-coupling link 132 may slide along the first sub-coupling link 131. One of the first sub-coupling link 131 and the second sub-coupling link 132 may have a hollow, and at least a portion of the other one of the first sub-coupling link 131 and the second sub-coupling link 132 may be inserted into the hollow. For example, at least a portion of the first sub-coupling link 131 may be inserted into a hollow of the second sub-coupling link 132. As an inserting length of the first sub-coupling link 131 into the second sub-coupling link 132 increases, a distance between the third joint J3 and the fourth joint J4 may decrease. That is, the length of the coupling link 13 may decrease.

The second sub-coupling link 132 may include a longitudinal slot 132a, and the first sub-coupling link 131 may include a plurality of insertion recesses 131a a predetermined distance spaced apart from each other in a longitudinal direction of the first sub-coupling link 131 and communicating with the longitudinal slot 132a. The coupling link 13 may include the coupling link fixture 133 configured to fix the first sub-coupling link 131 and the second sub-coupling link 132. For example, the coupling link fixture 133 may be a bolt.

By the first sub-coupling link 131, the second sub-coupling link 132, and the coupling link fixture 133, the distance between the third joint J3 and the fourth joint J4 may change. When the distance between the third joint J3 and the fourth joint J4 changes while the distance between the first rotation axis A1 and the fourth joint J4 is fixed, the position of the RCM of the motion assistance apparatus may change. When the distance between the third joint J3 and the fourth joint J4 increases, the distance from the support link 10 to the RCM may decrease. When the distance between the third joint J3 and the fourth joint J4 decreases, the distance from the support link 10 to the RCM may increase. A mechanism in which the position of the RCM of the motion assistance apparatus changes when the distance between the third joint J3 and the fourth joint J4 changes will be described further with reference to FIGS. 19 through 21.

Figure 10:
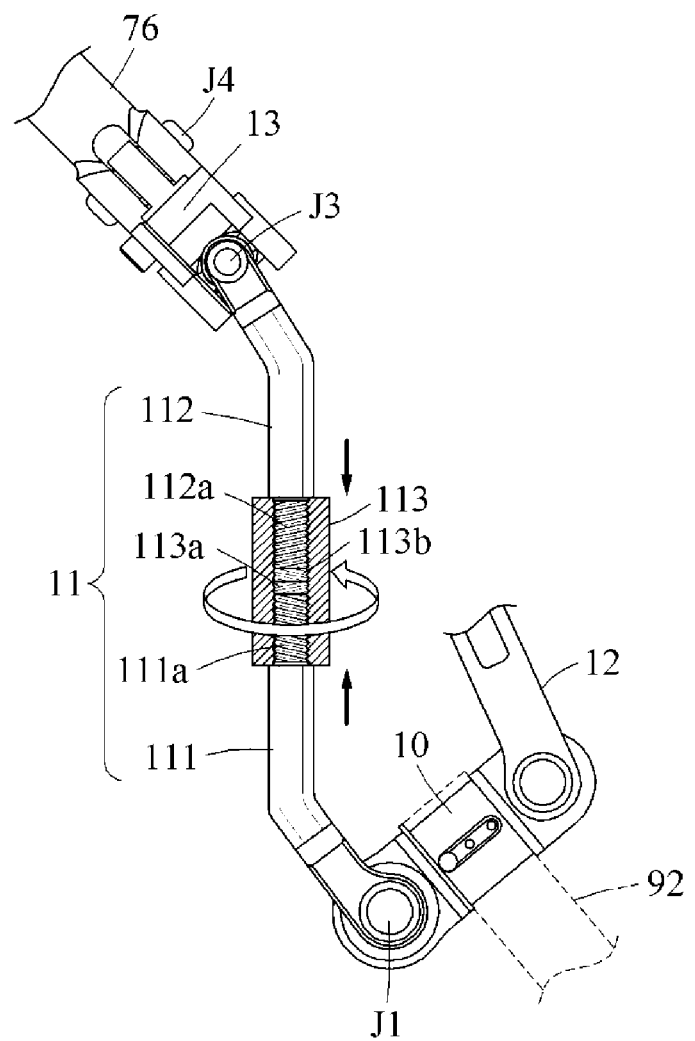
FIG. 10 is a perspective view illustrating a first drive link according to at least one example embodiment.
Figure 11:
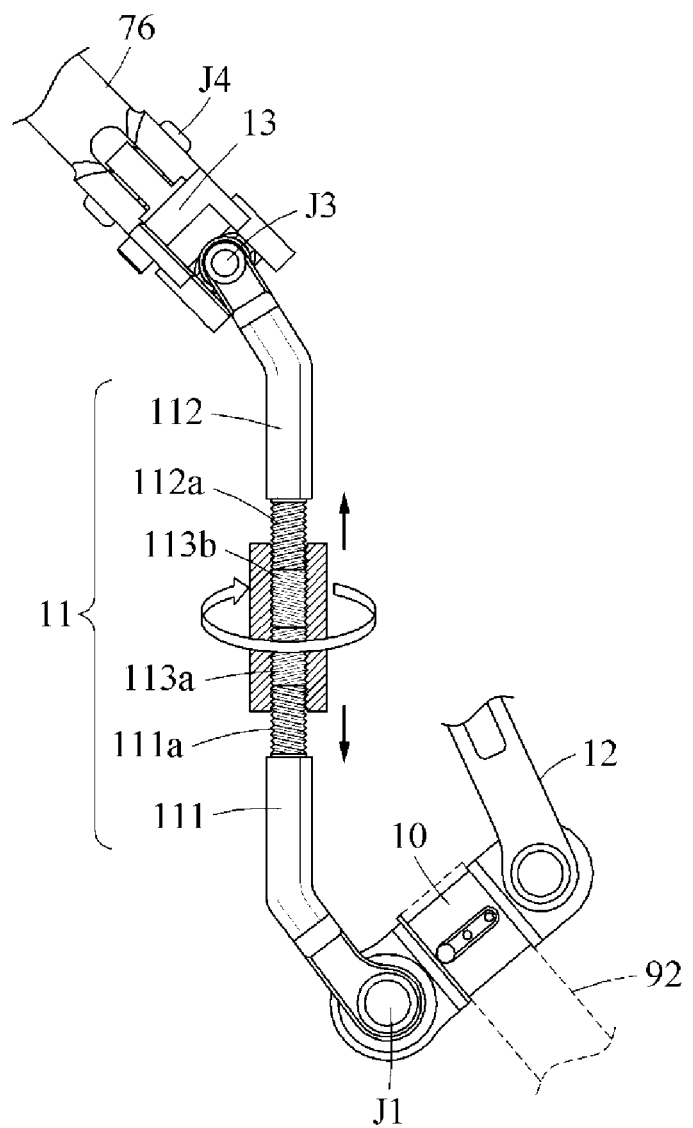
FIG. 11 is a perspective view illustrating a first drive link with an increased length according to at least one example embodiment.

FIG. 10 is a perspective view illustrating a first drive link according to at least one example embodiment, and FIG. 11 is a perspective view illustrating the first drive link with an increased length according to at least one example embodiment.

Referring to FIGS. 10 and 11, the first drive link 11 may have a variable length. For example, the first drive link 11 may include the first sub-drive link 111, the second sub-drive link 112, and the driving link fixture 113.

The first sub-drive link 111 may be rotatably connected to the support link 10 by the first joint J1 with 2-DOF. The second sub-drive link 112 may be rotatably connected to the coupling link 13 by the third joint J3. The first sub-drive link 111 and the second sub-drive link 112 may move relative to each other. For example, the driving link fixture 113 may be a turnbuckle screwed to the first sub-drive link 111 and the second sub-drive link 112.

The first sub-drive link 111 may include a first insertion part 111a to be inserted and screwed into the driving link fixture 113, and the second sub-drive link 112 may include a second insertion part 112a to be inserted and screwed into the driving link fixture 113. The first insertion part 111a and the second insertion part 112a may face each other, and include threads of different directions. For example, in a case in which the first insertion part 111a is a right-hand screw, the second insertion part 112a may be a left-hand screw. The driving link fixture 113 may include first threads 113a corresponding to the right-hand screw at a portion into which the first insertion part 111a is to be inserted, and second threads 113b corresponding to the left-hand screw at a portion into which the second insertion part 112a is to be inserted. The first threads 113a and the second threads 113b may be of opposite directions. By the above structure, when the driving link fixture 113 rotates, the first sub-drive link 111 and the second sub-drive link 112 may move away from or toward a center of the driving link fixture 113 without rotating relatively.

For example, when the driving link fixture 113 rotates counterclockwise as shown in FIG. 10, the first sub-drive link 111 and the second sub-drive link 112 may move toward each other. Conversely, when the driving link fixture 113 rotates clockwise as shown in FIG. 11, the first sub-drive link 111 and the second sub-drive link 112 may move away from each other.

When the length of the first drive link 11 changes, a range of motion (ROM) of the motion assistance apparatus may change. When the length of the first drive link 11 decreases, a minimum angle between the support link 10 and the second drive link 12 of FIG. 1 may decrease. When the length of the first drive link 11 increases, the minimum angle between the support link 10 and the second drive link 12 may increase.

Similarly, when the length of the second drive link 12 changes, the ROM of the motion assistance apparatus may change. On the contrary to the first drive link 11, when the length of the second drive link 12 increases, the minimum angle between the support link 10 and the second drive link 12 may decrease. When the length of the second drive link 12 decreases, the minimum angle between the support link 10 and the second drive link 12 may increase.

A mechanism in which the ROM of the motion assistance apparatus changes when the length of the first drive link 11 changes will be described further with reference to FIGS. 22 through 24.

Although a case in which the first sub-drive link 111 and the second sub-drive link 112 include threads and the driving link fixture 113 is a turnbuckle is described with reference to FIGS. 10 and 11, a method of adjusting the length of the first drive link 11 is not limited thereto.

For example, as described with reference to FIGS. 6 through 10, one of the first drive link 11 and the second drive link 12 may include a first sub-drive link having a longitudinal slot, a second sub-drive link having a plurality of insertion recesses, and a driving link fixture to be inserted into the longitudinal slot and one of the plurality of insertion recesses.

Similarly, the support link 10 may include a first sub-support link and a second sub-support link having threads, and a turnbuckle configured to connect the first sub-support link and the second sub-support link. Further, the coupling link 13 may include a first sub-coupling link and a second sub-coupling link having threads, and a turnbuckle configured to connect the first sub-coupling link and the second sub-coupling link.

Figure 12A:
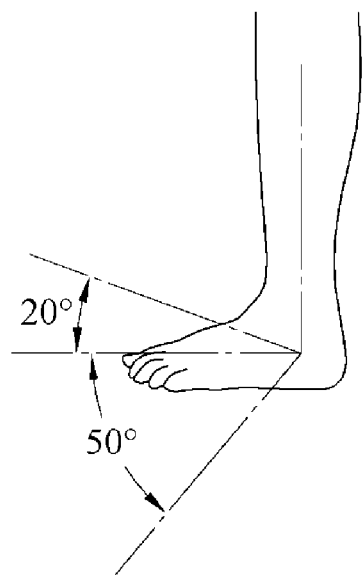
FIG. 12A illustrates an example of a range of motion (ROM) of an talocrural joint of a user with an angle of 90 degrees between a foot and a shank when standing erect.
Figure 12B:
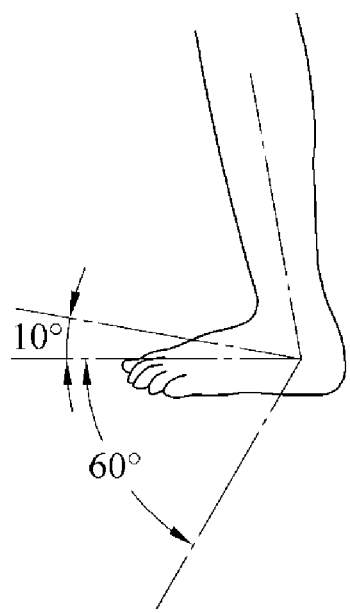
FIG. 12B illustrates an example of an ROM of an talocrural joint of a user with an angle of 80 degrees between a foot and a shank when standing erect.
Figure 12C:
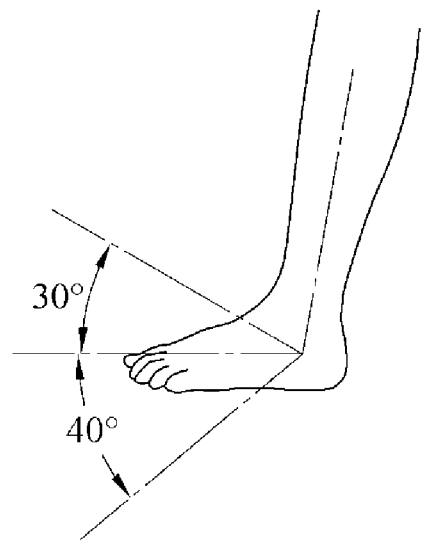
FIG. 12C illustrates an example of an ROM of an talocrural joint of a user with an angle of 100 degrees between a foot and a shank when standing erect.

FIG. 12A illustrates an example of an ROM of an talocrural joint of a user with an angle of 90 degrees between a foot and a shank when standing erect, FIG. 12B illustrates an example of an ROM of an talocrural joint of a user with an angle of 80 degrees between a foot and a shank when standing erect, and FIG. 12C illustrates an example of an ROM of an talocrural joint of a user with an angle of 100 degrees between a foot and a shank when standing erect.

Referring to FIGS. 12A to 12C, it was found through tests on a number of people that each individual feels most comfortable in a different position of standing erect, that is, has a different neutral position, as shown in FIGS. 12A through 12C. Each individual has different maximum angles of a dorsi flexion motion and a plantar flexion motion in a neutral position. Thus, it may be desirable to match an ROM of a motion assistance apparatus and an ROM of a user. In an example, by changing the length of the first drive link 11 and/or the length of the second drive link 12, the ROM of the motion assistance apparatus may be adjusted, whereby a talocrural joint motion of the user may be assisted efficiently and a user wearability may improve. Description related thereto will be described further with reference to FIGS. 22 through 24.

Figure 13:
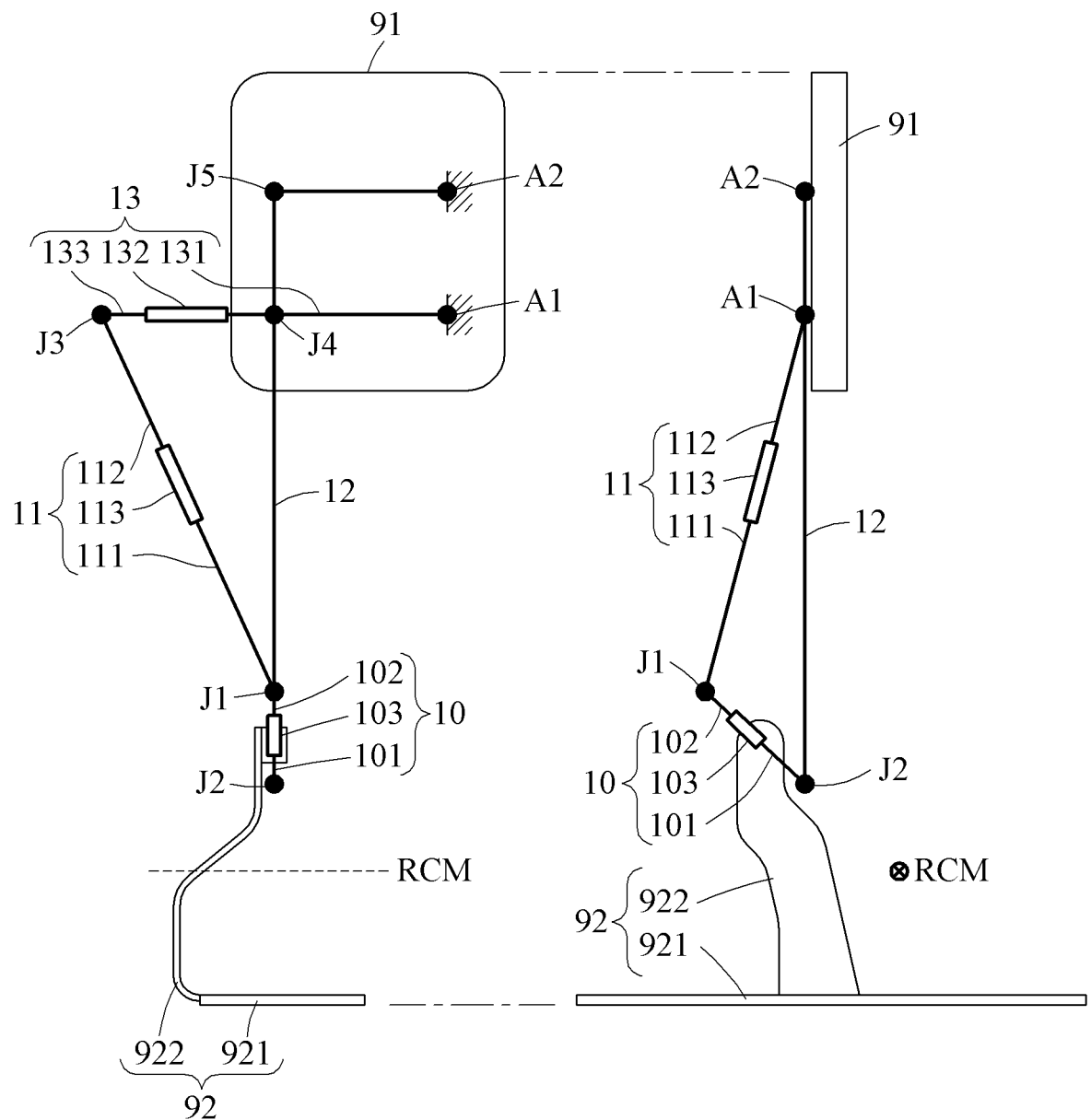
FIG. 13 illustrates a motion assistance apparatus according to at least one example embodiment.
Figure 14:
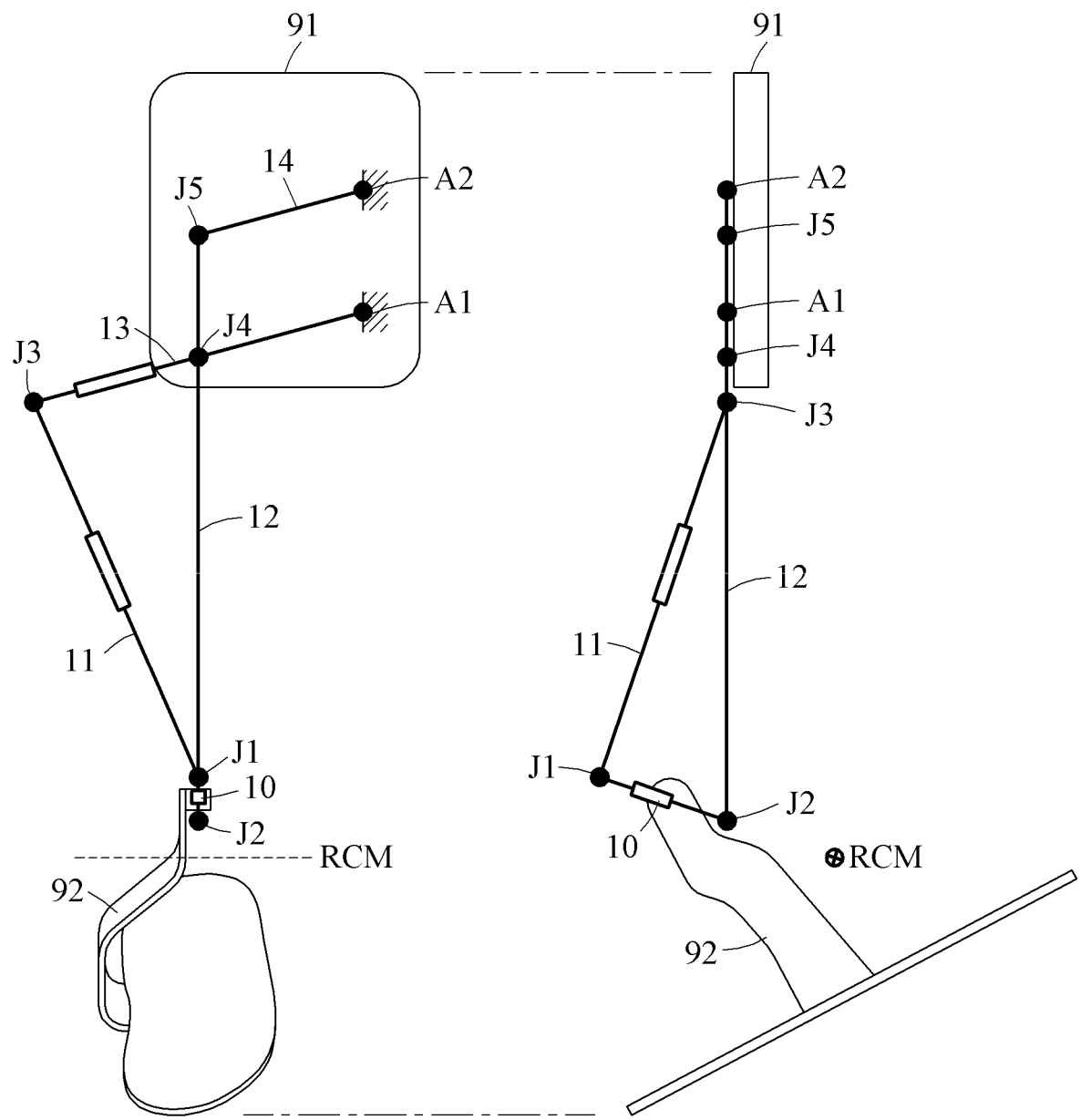
FIG. 14 illustrates a motion assistance apparatus being driven to assist a plantar flexion motion of a user according to at least one example embodiment.
Figure 15:
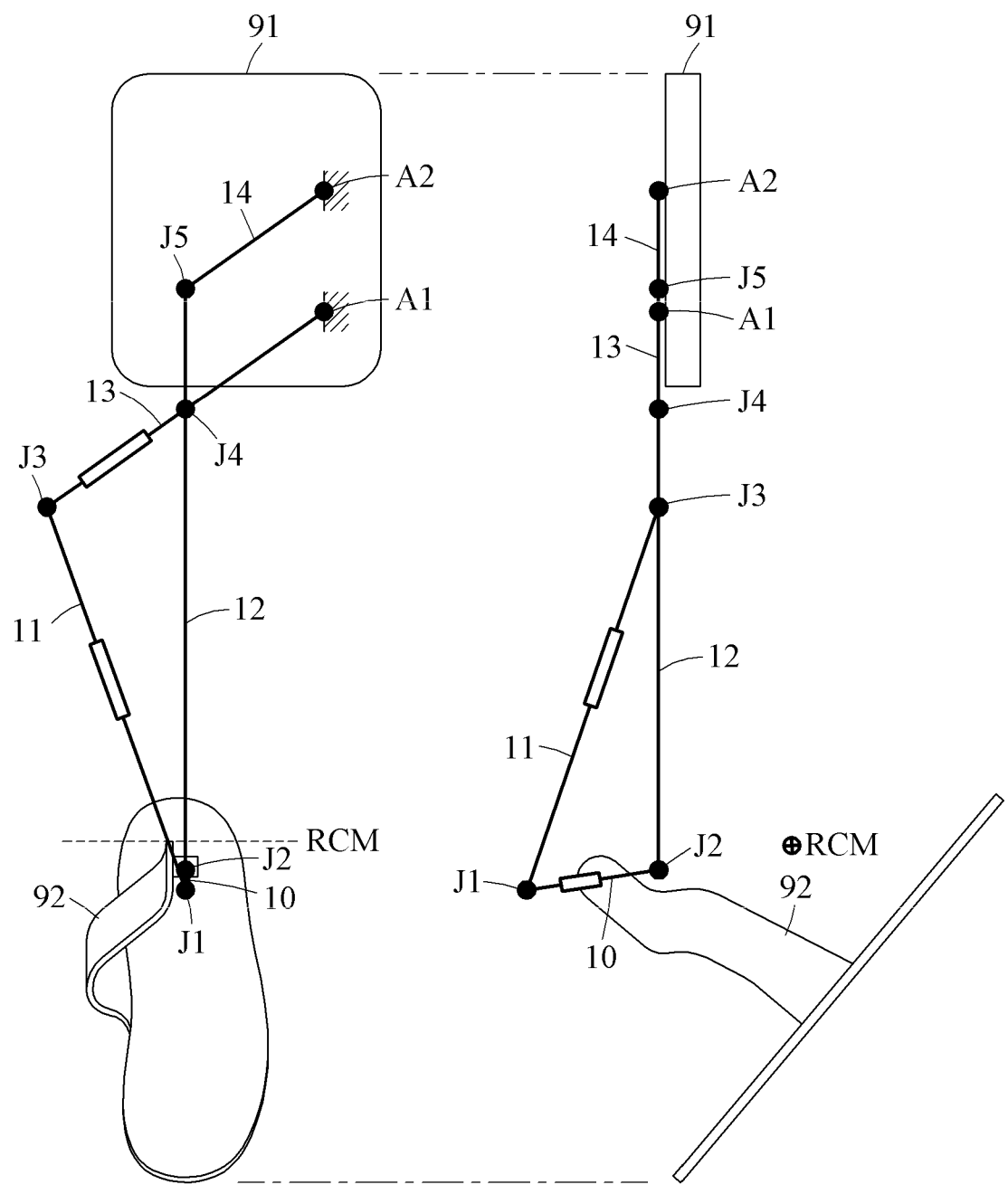
FIG. 15 illustrates a motion assistance apparatus being driven to assist a plantar flexion motion of a user according to at least one example embodiment.

FIG. 13 illustrates a motion assistance apparatus according to at least one example embodiment, and FIGS. 14 and 15 illustrate the motion assistance apparatus being driven to assist a plantar flexion motion of a user according to at least one example embodiment.

Referring to FIGS. 13 through 15, the motion assistance apparatus may include the proximal support 91, the distal support 92, the support link 10, the first drive link 11, the second drive link 12, the coupling link 13, and the connecting link 14.

The support link 10 may simultaneously perform a translational motion and a rotational motion with respect to the proximal support 91. The first joint J1 connecting the support link 10 and the first drive link 11 may be in front of the second drive link 12, and the third joint J3 connecting the first drive link 11 and the coupling link 13 may be beside the second drive link 12. By this joint arrangement, the second drive link 12, the coupling link 13, and the connecting link 14 may move on a plane parallel to the proximal support 91, and the first drive link 11 and the second drive link 12 may move relatively on the sagittal plane. Further, in response to the relative movement of the first drive link 11 and the second drive link 12, the distal support 92 connected to the first drive link 11 and the second drive link 12 by the support link 10 may rotate about the RCM formed in the vicinity of the talocrural joint of the user.

Hereinafter, FIGS. 16 through 24 each illustrate the motion assistance apparatus on a two-dimensional (2D) plane for ease of description. FIGS. 16 through 24 each illustrate a structure in which the support link 10, the first drive link 11, and the second drive link 12 move on the same plane. However, it is apparent to one of ordinary skill in the art that the structures illustrated in FIGS. 13 through 15 may operate in the same manner.

Figure 16:
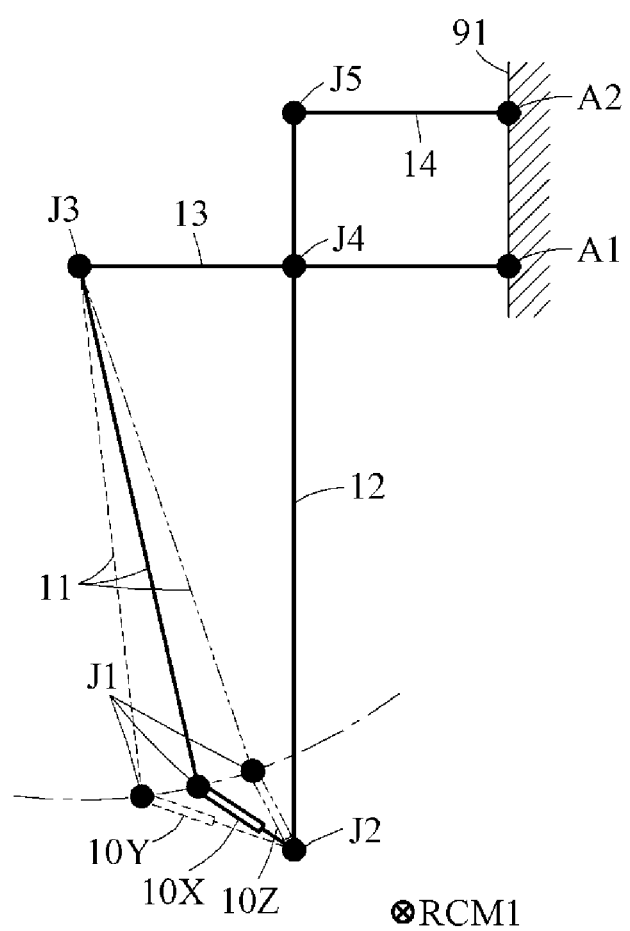
FIG. 16 illustrates a support link with a variable length according to at least one example embodiment.
Figure 17:
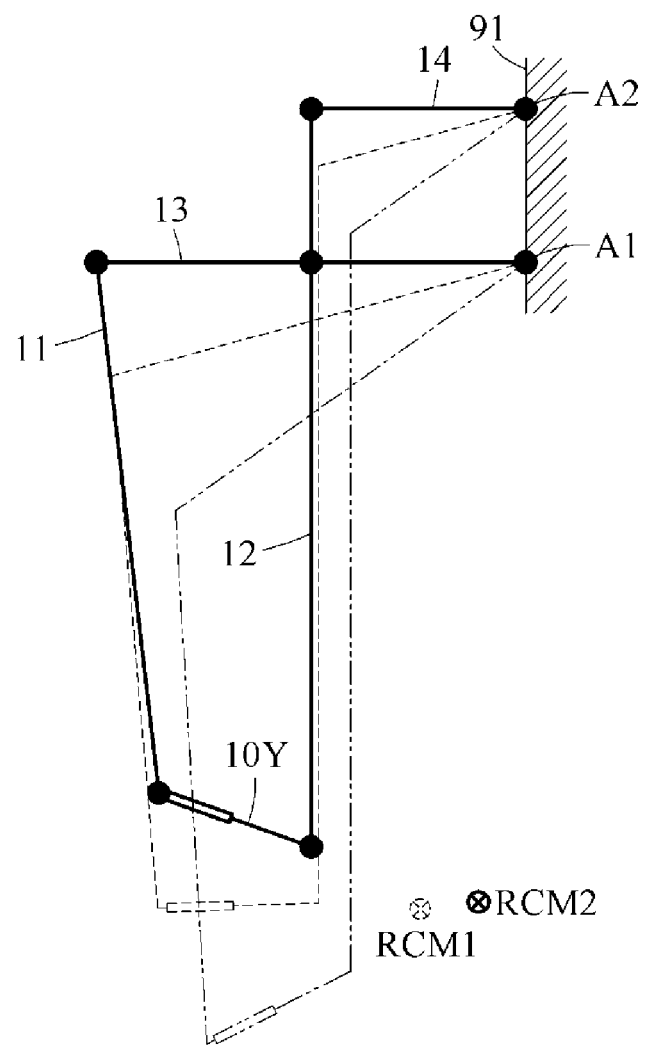
FIG. 17 illustrates an operation of a motion assistance apparatus when a length of a support link increases according to at least one example embodiment.
Figure 18:
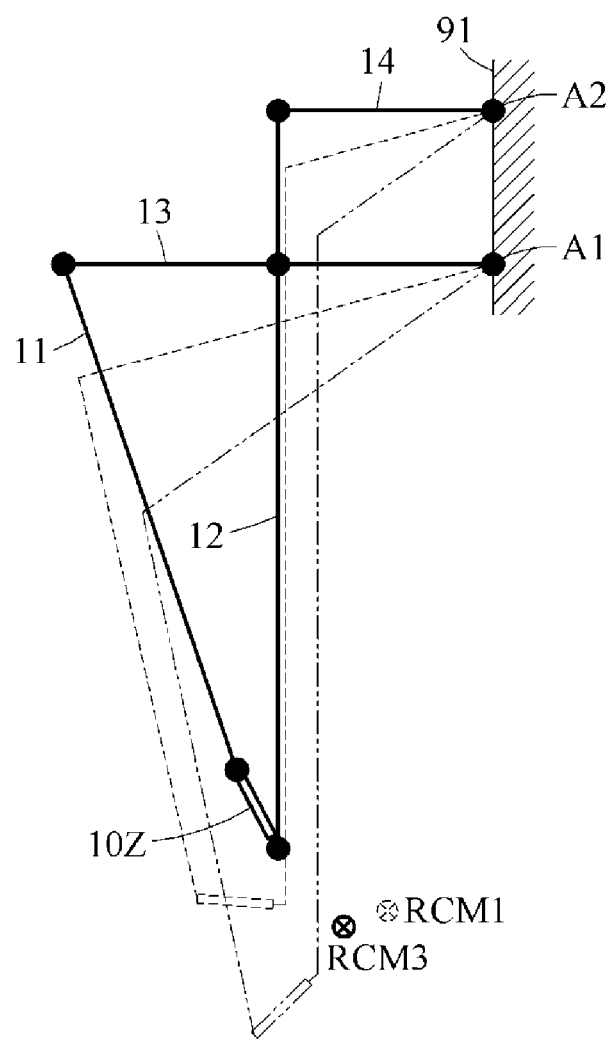
FIG. 18 illustrates an operation of a motion assistance apparatus when a length of a support link decreases according to at least one example embodiment.

FIG. 16 illustrates a support link with a variable length according to at least one example embodiment, FIG. 17 illustrates an operation of a motion assistance apparatus when the length of the support link increases according to at least one example embodiment, and FIG. 18 illustrates an operation of the motion assistance apparatus when the length of the support link decreases according to at least one example embodiment.

Referring to FIGS. 16 through 18, a support link 10X, 10Y, 10Z may have a variable length. In FIG. 16, RCM1 denotes an RCM of a motion assistance apparatus including the support link 10X being in an initial state. In FIG. 17, RCM2 denotes an RCM of the motion assistance apparatus including the support link 10Y with an increased length. In FIG. 18, RCM3 denotes an RCM of the motion assistance apparatus including the support link 10Z with a decreased length.

RCM2 may be formed at a position farther away from the support link 10X, 10Y, 10Z than RCM1, and RCM3 may be formed at a position closer to the support link 10X, 10Y, 10Z than RCM1. When the length of the support link 10X, 10Y, 10Z increases, the RCM may move away from the support link 10X, 10Y, 10Z. When the length of the support link 10X, 10Y, 10Z decreases, the RCM may move toward the support link 10X, 10Y, 10Z.

A user having a thick ankle or foot may place an RCM of a distal support in the vicinity of a talocrural joint of the user by increasing the length of the support link 10 as shown in FIG. 17, and a user having a thin ankle or foot may place the RCM of the distal support in the vicinity of a talocrural joint of the user by decreasing the length of the support link 10 as shown in FIG. 18.

Figure 19:
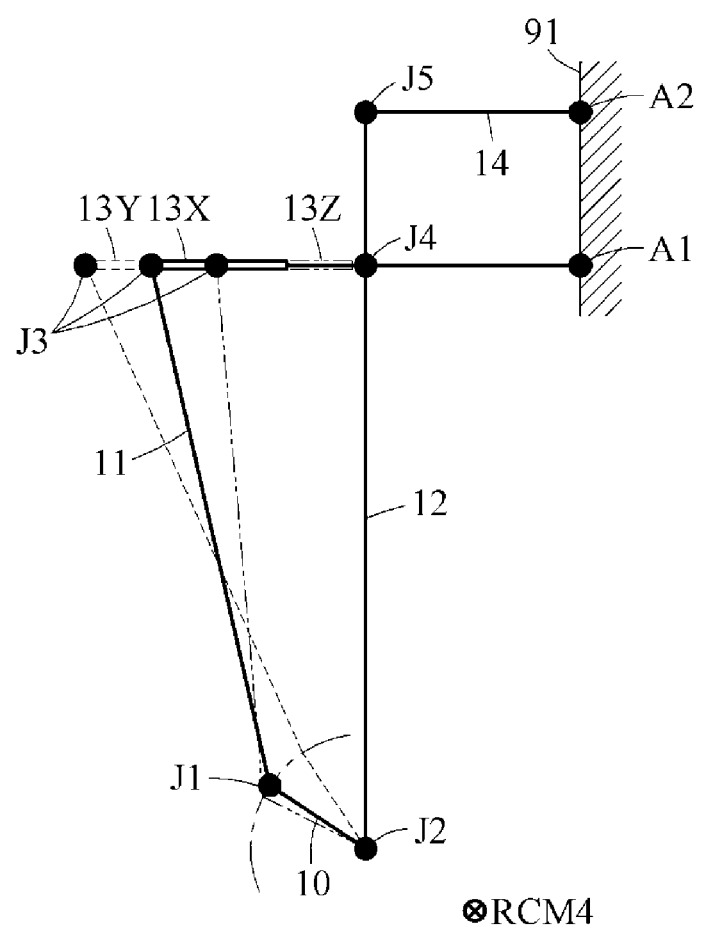
FIG. 19 illustrates a coupling link with a variable length according to at least one example embodiment.
Figure 20:
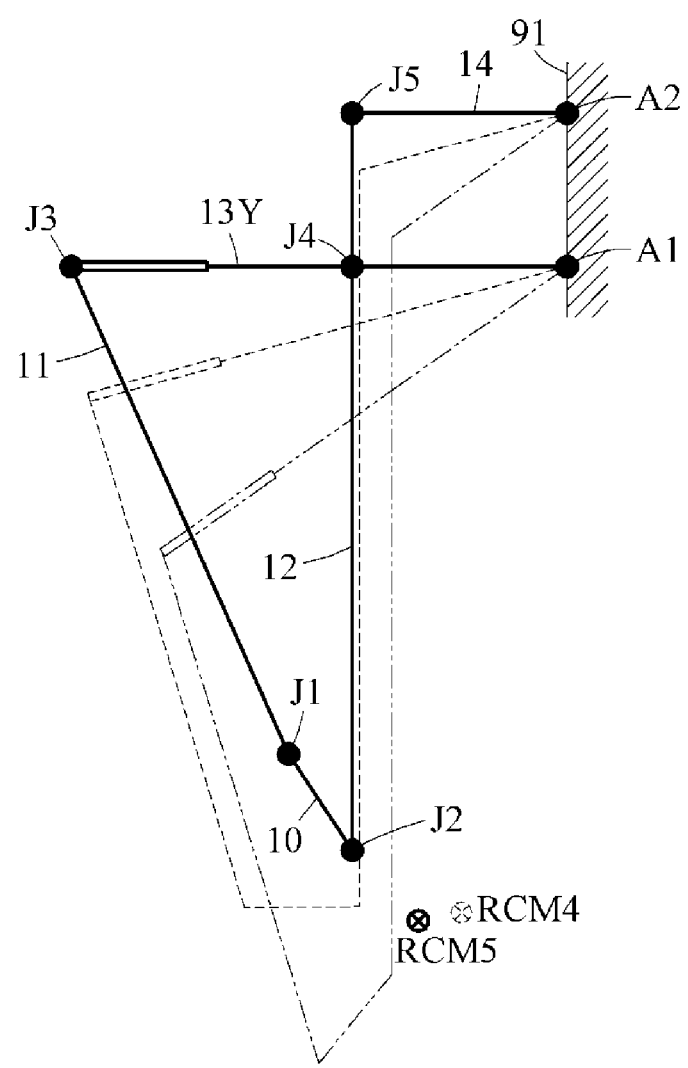
FIG. 20 illustrates an operation of a motion assistance apparatus when a length of a coupling link increases according to at least one example embodiment.
Figure 21:
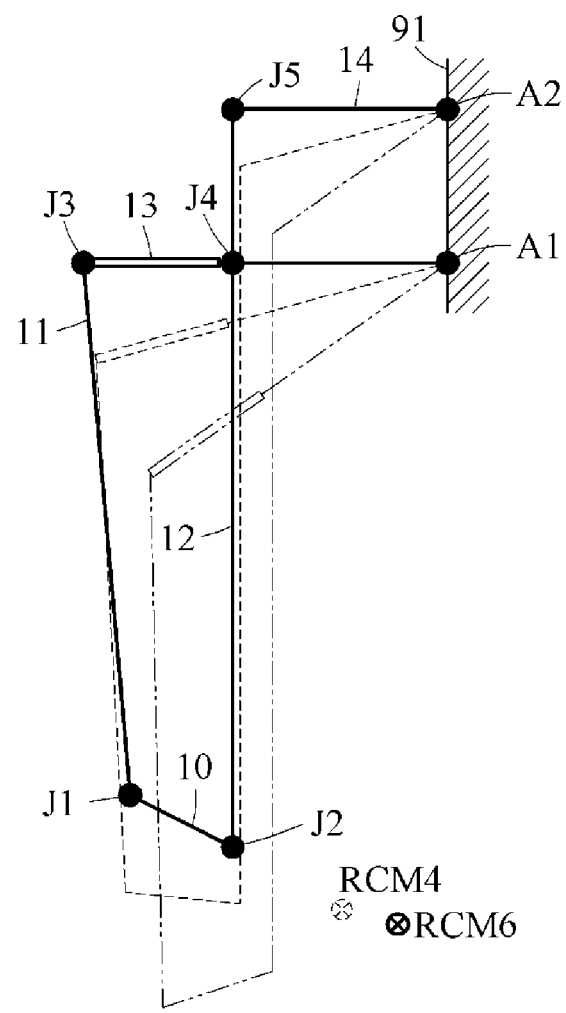
FIG. 21 illustrates an operation of a motion assistance apparatus when a length of a coupling link decreases according to at least one example embodiment.

FIG. 19 illustrates a coupling link with a variable length according to at least one example embodiment, FIG. 20 illustrates an operation of a motion assistance apparatus when the length of the coupling link increases according to at least one example embodiment, and FIG. 21 illustrates an operation of the motion assistance apparatus when the length of the coupling link decreases according to at least one example embodiment.

Referring to FIGS. 19 through 21, a coupling link 13X, 13Y, 13Z may have a variable length. In FIG. 19, RCM4 denotes an RCM of a motion assistance apparatus including the coupling link 13X being in an initial state. In FIG. 20, RCM5 denotes an RCM of the motion assistance apparatus including the coupling link 13Y with an increased length. In FIG. 21, RCM6 denotes an RCM of the motion assistance apparatus including the coupling link 13Z with a decreased length.

RCM5 may be formed at a position closer to the support link 10X, 10Y, 10Z than RCM4, and RCM6 may be formed at a position farther away from the support link 10X, 10Y, 10Z than RCM4. When the length of the coupling link 13X, 13Y, 13Z increases, the RCM may move toward the support link 10X, 10Y, 10Z. When the length of the coupling link 13X, 13Y, 13Z decreases, the RCM may move away from the support link 10X, 10Y, 10Z.

A user having a thin ankle or foot may place an RCM of a distal support in the vicinity of a talocrural joint of the user by increasing the length of the coupling link 13 as shown in FIG. 20, and a user having a thick ankle or foot may place the RCM of the distal support in the vicinity of a talocrural joint of the user by decreasing the length of the coupling link 13 as shown in FIG. 21.

Figure 22:
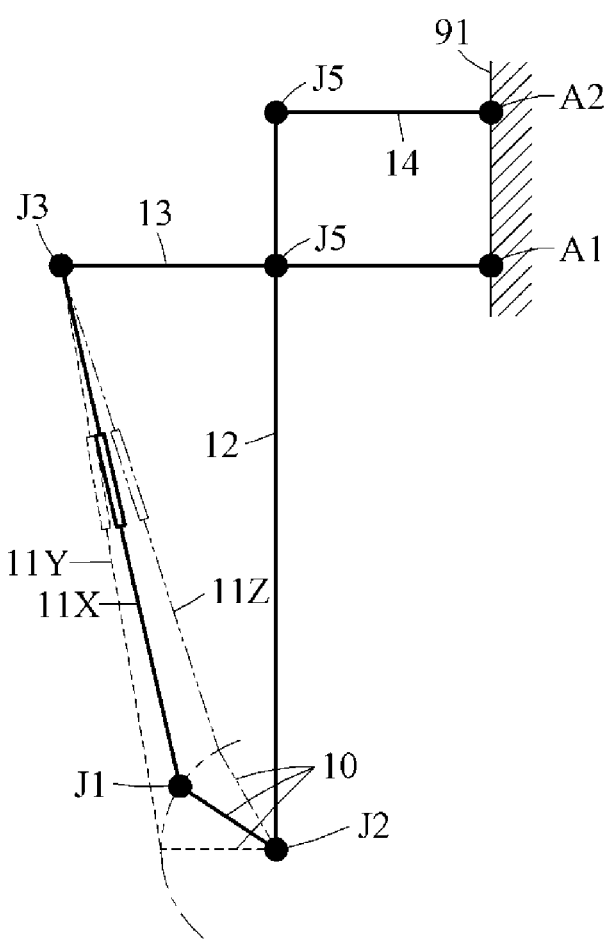
FIG. 22 illustrates a first drive link with a variable length according to at least one example embodiment.
Figure 23:
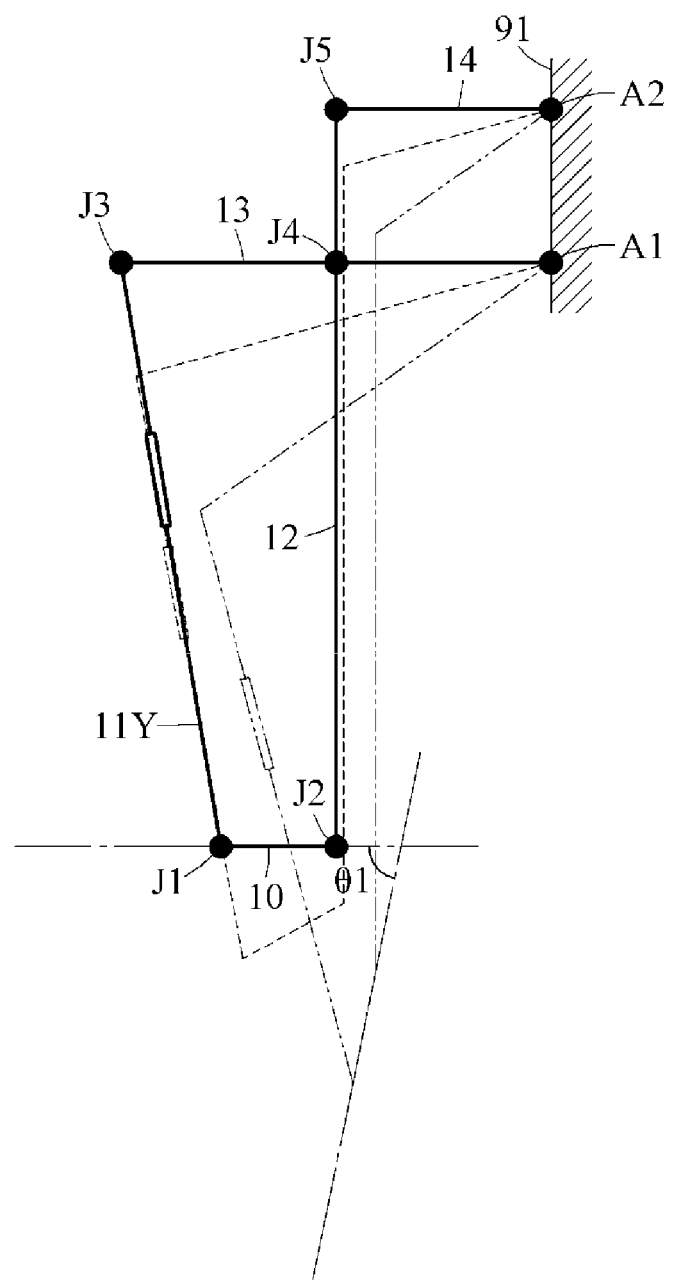
FIG. 23 illustrates an operation of a motion assistance apparatus when a length of a first drive link increases according to at least one example embodiment.
Figure 24:
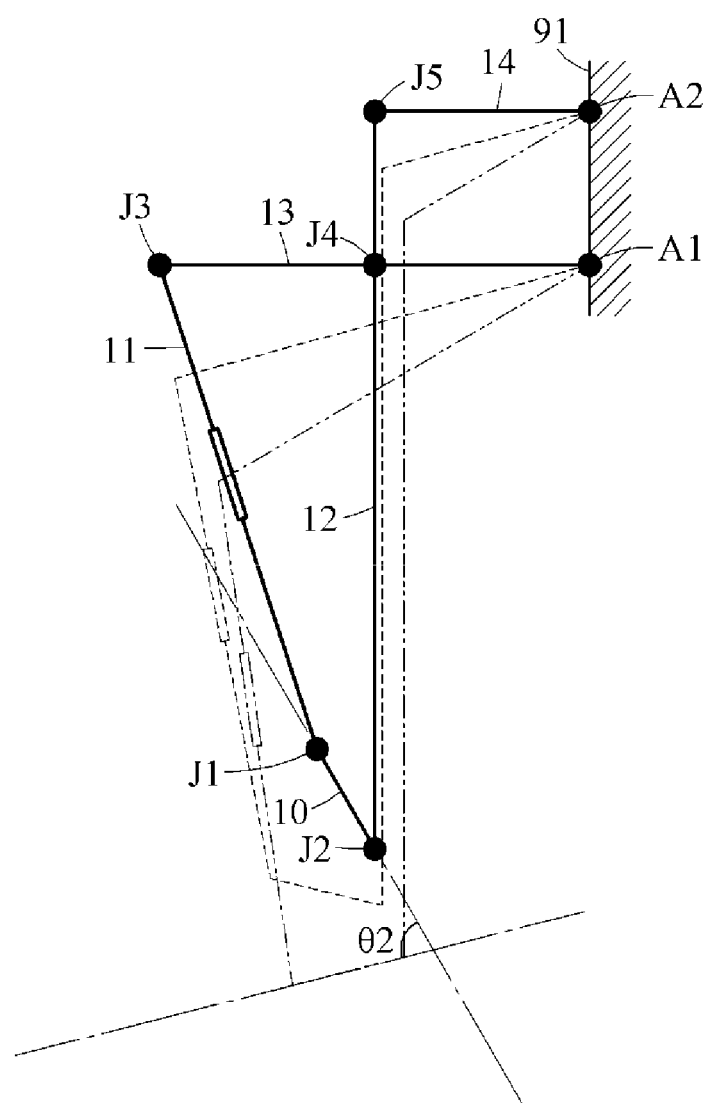
FIG. 24 illustrates an operation of a motion assistance apparatus when a length of a first drive link decreases according to at least one example embodiment.

FIG. 22 illustrates a first drive link with a variable length according to at least one example embodiment, FIG. 23 illustrates an operation of a motion assistance apparatus when the length of the first drive link increases according to at least one example embodiment, and FIG. 24 illustrates an operation of the motion assistance apparatus when the length of the first drive link decreases according to at least one example embodiment.

Referring to FIGS. 22 through 24, a first drive link 11X, 11Y, 11Z may have a variable length. ROMs of the support link 10 that change in response to a change in the length of the first drive link 11X, 11Y, 11Z when rotating the coupling link 13 with respect to the proximal support 91 within the same angle range are indicated as θ1 and θ2. In FIG. 23, θ1 denotes an ROM of the support link 10 when the length of the first drive link 11Y increases. In FIG. 24, θ2 denotes an ROM of the support link 10 when the length of the first drive link 11Z decreases.

When the length of the first drive link 11X, 11Y, 11Z increases, the minimum angle between the support link 10 and the second drive link 12 may increase. When the length of the first drive link 11X, 11Y, 11Z decreases, the minimum angle between the support link 10 and the second drive link 12 may decrease. That is, when the length of the first drive link 11X, 11Y, 11Z increases, the minimum angle between the distal support 92 and the proximal support 91 may increase and thus a maximum angle of a plantar flexion motion may increase. When the length of the first drive link 11X, 11Y, 11Z decreases, the minimum angle between the distal support 92 and the proximal support 91 may decrease and thus a maximum angle of a dorsi flexion motion may increase.

In some example embodiments, movable parts including support link 10, the first drive link 11, the second drive link 12, the coupling link 13 an the connecting link 14 may be disposed on a front side between the ankle and a forefoot of the user while the user is wearing the motion assistance apparatus 1. Therefore, the support link 10 may rotate about a vicinity of a talocrural joint of the user as a remote center of motion (RCM), without being connected to a configuration disposed on an axis of the talocrural joint of the user. Further, when the movable parts are disposed on the front side of the lower leg, the user may put on or off typical shoes such as sneakers while wearing the motion assistance apparatus 1, and thus the user convenience may improve.

Further, as described above, in some example embodiments, the position of the remote center of motion (RCM) may be adjusted by adjusting the length of the support link 10 and/or the coupling link 13 to match the RCM of the motion assistance apparatus with the RCM of the talocrural joint of the user so that an assistance force may be applied effectively to the user.

Additionally, as described above, when the minimum angle between the support link 10 and the second drive link 12 changes, the ROM of the motion assistance apparatus may change. For example, a user standing erect in a neutral position as shown in FIG. 12B may increase the maximum angle of the plantar flexion motion by increasing the length of the first drive link 11 as shown in FIG. 23. Conversely, a user standing erect in a neutral position as shown in FIG. 12C may increase the maximum angle of the dorsi flexion motion by decreasing the length of the first drive link 11 as shown in FIG. 24. When the ROM of the distal support 92 is matched to an ROM of an ankle of the user by increasing or decreasing the length of the first drive link 11, an ankle motion of the user may be assisted efficiently and a user wearability may improve.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A motion assistance apparatus, comprising:
a proximal support configured to support a proximal part of a user, the proximal part of the user being a shank of the user;
a first drive link and a second drive link, the first drive link and the second drive link each configured to perform translational motions with respect to the proximal support;

a coupling link configured to rotate about a first rotation axis on the proximal support, the coupling link rotatably connected to the first drive link by a first joint and rotatably connected to the second drive link by a second joint, where a distance between the first joint and the first rotational axis is greater than a distance between the second joint and the first rotational axis such that, when the coupling link rotates, the first drive link and the second drive link perform the translational motions at different velocities;

a support link having a first end and a second end, the first end rotatably connected to the first drive link and the second end rotatably connected to the second drive link, the support link configured to vary a length thereof, the support link being on a front side of the user when the user wears the motion assistance apparatus; and a distal support rotatably connected to the support link, the distal support configured to support a distal part of the user, the distal part of the user being a foot of the user.

2. The motion assistance apparatus of claim 1, wherein the support link is configured to simultaneously perform a translational motion and a rotational motion with respect to the proximal support.

3. The motion assistance apparatus of claim 1, wherein the support link is configured to rotate about a remote center of motion (RCM) in a joint of the user connecting the distal part and the proximal part of the user, or in a vicinity of the joint.

4. The motion assistance apparatus of claim 3, wherein
the support link is configured to increase a distance from the support link to the RCM, in response to an increase in the length of the support link, and
the support link is configured to decrease the distance from the support link to the RCM in response to a decrease in the length of the support link.

5. The motion assistance apparatus of claim 4, wherein the support link comprises:
a first sub-support link rotatably connected to the first drive link; and
a second sub-support link rotatably connected to the second drive link, wherein
the support link is configured to adjust a set distance between the first sub-support link and the second sub-support link.

6. The motion assistance apparatus of claim 5, wherein the first sub-support link is configured to slide along the second sub-support link to adjust the set distance, and the support link further comprises:
a support link fixture configured to fix the first sub-support link and the second sub-support link at the set distance.

7. The motion assistance apparatus of claim 5, wherein the support link further comprises:
a turnbuckle configured to screw to the first sub-support link and the second sub-support link to fix the first sub-support link and the second sub-support link at the set distance.

8. The motion assistance apparatus of claim 1, further comprising:
a connecting link configured to rotate about a second rotation axis on the proximal support, the connecting link rotatably connected to the second drive link, the first rotation axis being a different rotational axis from the second rotation axis.

9. The motion assistance apparatus of claim 8, wherein the coupling link and the connecting link are both connected to the second drive link such that the coupling link and the connecting link are in parallel.

10. A motion assistance apparatus, comprising:
a proximal support configured to support a proximal part of a user;
a first drive link and a second drive link, the first drive link and the second drive link each configured to perform translational motions with respect to the proximal support;
a support link rotatably connected to the first drive link and the second drive link;
a distal support connected to the support link, the distal support configured to support a distal part of the user; and
a coupling link configured to rotate about a first rotation axis on the proximal support, the coupling link rotatably connected to the first drive link by a first joint and rotatably connected to the second drive link by a second joint, where a distance between the first joint and the first rotational axis is greater than a distance between the second joint and the first rotational axis such that, when the coupling link rotates, the first drive link and the second drive link perform the translational motions at different velocities, the coupling link configured to vary a length thereof such that,
the coupling link is configured to increase a distance from the support link to a remote center of motion (RCM) of a joint of a user in response to an increase in the length of the coupling link, and
the coupling link is configured to decrease the distance from the support link to the RCM in response to a decrease in the length of the coupling link.

11. The motion assistance apparatus of claim 10, wherein
the first drive link is connected to a first portion of the coupling link,
the second drive link is connected to a second portion of the coupling link, and
the coupling link is configured to adjust a distance between the first portion and the second portion by varying the length of the coupling link.

12. The motion assistance apparatus of claim 10, wherein the support link is configured to simultaneously perform a translational motion and a rotational motion with respect to the proximal support.

13. The motion assistance apparatus of claim 10, wherein the support link is configured to rotate about the RCM in the joint of the user connecting the distal part and the proximal part of the user, or in a vicinity of the joint.

14. The motion assistance apparatus of claim 10, wherein the coupling link comprises:
a first sub-coupling link rotatably connected to the first rotation axis; and
a second sub-coupling link rotatably connected to the first drive link, the second sub-coupling link configured to move relative to the first sub-coupling link.

15. The motion assistance apparatus of claim 10, further comprising:
a connecting link configured to rotate about a second rotation axis on the proximal support, the second rotation axis being a different axis from the first rotation axis, the connecting link rotatably connected to the second drive link such that the connecting link and the coupling link are in parallel.

16. A motion assistance apparatus, comprising:
a proximal support configured to support a proximal part of a user;
a distal support configured to support a distal part of the user;
a support link connected to the distal support;
a first drive link rotatably connected to a first end of the support link, the first drive link configured to perform a translational motion with respect to the proximal support;
a second drive link rotatably connected to a second end of the support link, the second drive link configured to perform a translational motion with respect to the proximal support; and
a coupling link configured to rotate about a first rotation axis on the proximal support, the coupling link rotatably connected to the first drive link by a first joint and rotatably connected to the second drive link by a second joint, where a distance between the first joint and the first rotational axis is greater than a distance between the second joint and the first rotational axis such that, when the coupling link rotates, the second drive links performs the translational motion with respect to the proximal support at a slower velocity than the first drive link performs the translational motion with respect to the proximal support, wherein
at least one of the first drive link and the second drive link is configured to vary a length thereof, the at least one of the first drive link and the second drive link including,
a first sub-drive link rotatably connected to the first end of the support link;
a second sub-drive link configured to one of (i) move relative to the first sub-drive link or (ii) slide along the first sub-drive link, the second sub-drive link configured to vary the length of a respective one of the at least one of the first drive link and the second drive link; and
one of (i) a turnbuckle screwed to the first sub-drive link and the second sub-drive link or (ii) a drive link fixture configured to fix the first sub-drive link and the second sub-drive link, the one of the turnbuckle or drive link fixture configured to set the length of the respective one of the at least one of the first drive link and the second drive link.

17. The motion assistance apparatus of claim 16, wherein the support link is configured to simultaneously perform a translational motion and a rotational motion with respect to the proximal support.

18. The motion assistance apparatus of claim 16, wherein
a minimum angle between the distal support and the proximal support decreases in response to a decrease in the length of the first drive link or an increase in the length of the second drive link, and
the minimum angle between the distal support and the proximal support increases in response to an increase in the length of the first drive link or a decrease in the length of the second drive link.

19. The motion assistance apparatus of claim 16, further comprising:
a connecting link configured to rotate about a second rotation axis on the proximal support, the connecting link rotatably connected to the second drive link, the second rotation axis being a different axis from the first rotation axis.

\* \* \* \* \*